US010963512B2

(12) United States Patent
Bedi et al.

(10) Patent No.: US 10,963,512 B2
(45) Date of Patent: Mar. 30, 2021

(54) QUERY LANGUAGE INTEROPERABILITY IN A GRAPH DATABASE

(71) Applicant: Amazon Technologies, Inc., Seattle, WA (US)

(72) Inventors: Kawarjit Bedi, Sammamish, WA (US); Piyush Gupta, Issaquah, WA (US); Sainath Chowdary Mallidi, Seattle, WA (US); Divij Vaidya, Seattle, WA (US); Andi Gutmans, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1055 days.

(21) Appl. No.: 15/411,596

(22) Filed: Jan. 20, 2017

(65) Prior Publication Data
US 2018/0210966 A1    Jul. 26, 2018

(51) Int. Cl.
| | |
|---|---|
| *G06F 17/00* | (2019.01) |
| *G06F 7/00* | (2006.01) |
| *G06F 16/901* | (2019.01) |
| *G06F 16/2453* | (2019.01) |
| *G06F 16/903* | (2019.01) |
| *G06F 16/2452* | (2019.01) |

(52) U.S. Cl.
CPC ...... *G06F 16/9024* (2019.01); *G06F 16/2452* (2019.01); *G06F 16/24542* (2019.01); *G06F 16/90335* (2019.01)

(58) Field of Classification Search
CPC ............. G06F 16/9024; G06F 16/2452; G06F 16/90335; G06F 16/24542

USPC .......................................... 707/715
See application file for complete search history.

(56) References Cited

U.S. PATENT DOCUMENTS

| | | | |
|---|---|---|---|
| 8,819,078 B2* | 8/2014 | Roy ................... | G06F 16/9024 707/802 |
| 9,116,975 B2* | 8/2015 | Shankar ............. | G06F 16/2452 |
| 9,330,138 B1 | 5/2016 | Shankar et al. | |

(Continued)

OTHER PUBLICATIONS

Marko A. Rodriguez, "The Gremlin Graph Traversal Machine and Language", Proceedings of the 2015 ACM Database Programming Languages Conference, Aug. 2015, Retrieved from URL: https://arxiv.org/pdf/1508.03843v1.pdf, pp. 1-10.

(Continued)

*Primary Examiner* — Pavan Mamillapalli
(74) *Attorney, Agent, or Firm* — Robert C. Kowert; Kowert, Hood, Munyon, Rankin & Goetzel, P.C.

(57) ABSTRACT

Methods, systems, and computer-readable media for query language interoperability in a graph database are disclosed. Data elements are inserted into a graph database using one or more of a plurality of graph database query languages. The graph database query languages comprise a first graph database query language associated with a first data model and a second graph database query language associated with a second data model. The data elements are stored in the graph database using an internal data model that differs from the first and second data models. One or more of the data elements are retrieved from the graph database based at least in part on a query. The query is expressed using a different graph database query language than the graph database query language used to insert the one or more retrieved data elements.

20 Claims, 18 Drawing Sheets

(56) References Cited

U.S. PATENT DOCUMENTS

| | | | |
|---|---|---|---|
| 9,378,241 | B1 | 6/2016 | Shankar et al. |
| 9,477,779 | B2 | 10/2016 | Webber et al. |
| 9,704,277 | B2* | 7/2017 | Hamedani ................. G06T 9/00 |
| 9,798,829 | B1* | 10/2017 | Baisley ............... G06F 16/9024 |
| 9,870,393 | B2* | 1/2018 | Chen ................ G06F 16/24544 |
| 10,216,860 | B2* | 2/2019 | Miranker ............ G06F 16/8365 |
| 10,387,496 | B2* | 8/2019 | Fokoue-Nkoutche ....................... G06F 16/9024 |
| 2003/0126152 | A1* | 7/2003 | Rajak .................... G06F 16/289 |
| 2008/0016038 | A1* | 1/2008 | Moestl ................ G06F 16/2433 707/999.003 |
| 2008/0273801 | A1* | 11/2008 | Podilchuk ............ G06K 9/3241 382/218 |
| 2009/0177955 | A1* | 7/2009 | Liu ..................... G06F 16/9535 715/200 |
| 2016/0092527 | A1* | 3/2016 | Kang .................... G06F 16/258 707/756 |
| 2016/0117358 | A1* | 4/2016 | Schmid ............... G06F 16/2228 707/736 |
| 2016/0342708 | A1* | 11/2016 | Fokoue-Nkoutche ....................... G06F 16/9024 |
| 2016/0342709 | A1* | 11/2016 | Fokoue-Nkoutche ....................... G06F 16/9024 |

OTHER PUBLICATIONS

Marko A. Rodriguez, "The Benefits of the Gremlin Graph Traversal Machine", Datastax.com, Sep. 2015, Retrieved from URL: http://www.datastax.com/dev/blog/the-benetits-of-the-gremlin-graph-traversal-machine, pp. 1-11.

Justin J. Miller, "Graph Database Applications and Concepts with Neo4j", Proceedings of the Southern Association for Information Systems Conference, Mar. 2013, pp. 141-147.

Jiewen Huang, et al., "Scalable SPARQL Querying of Large RDF Graphs", Proceedings of the VLDB Endowment, vol. 4, No. 11, Sep. 2011, pp. 1-12.

U.S. Appl. No. 15/360,872, filed Nov. 23, 2016, Kawarjit Bedi.

Hannah Blau et al., "A Visual Language for Querying and Updating Graphs", dated Feb. 29, 2004, Retrieved from URL https:www.researchgate.net/publication/2924449, pp. 1-13.

Sebastian Ferre Ed , et al., "Squall: A Controlled Natural Language for Querying and Updating RDF Graphs", dated Aug. 29, 2012, Copyright Spring-Verlag Berlin Heidelberg, pp. 1-15.

International Search Report and Written Opinion from PCT/US2018/014470, dated Jul. 3, 2018, Amazon Technologies, Inc., pp. 1-13.

* cited by examiner

US 10,963,512 B2

QUERY LANGUAGE INTEROPERABILITY IN A GRAPH DATABASE

BACKGROUND

As an increasing amount of data is generated, the need for storage and analysis of such data is similarly growing. In varied domains such as social media, mobile and messaging apps, web portals, and the Internet of Things (IoT), data may be both rich and highly connected. New relationships between data elements may be created at a high rate, and effective analysis of such data may often include analysis of the relationships. For example, modeling a social network may include modeling relationships between people. The relationships may change over time, and information relating to the people themselves may be added or modified over time as well. Applications that seek to analyze such information may require prompt answers to complex questions regarding networks of relationships, such as purchases or preferences relating to friends of a particular person.

Figure 1:
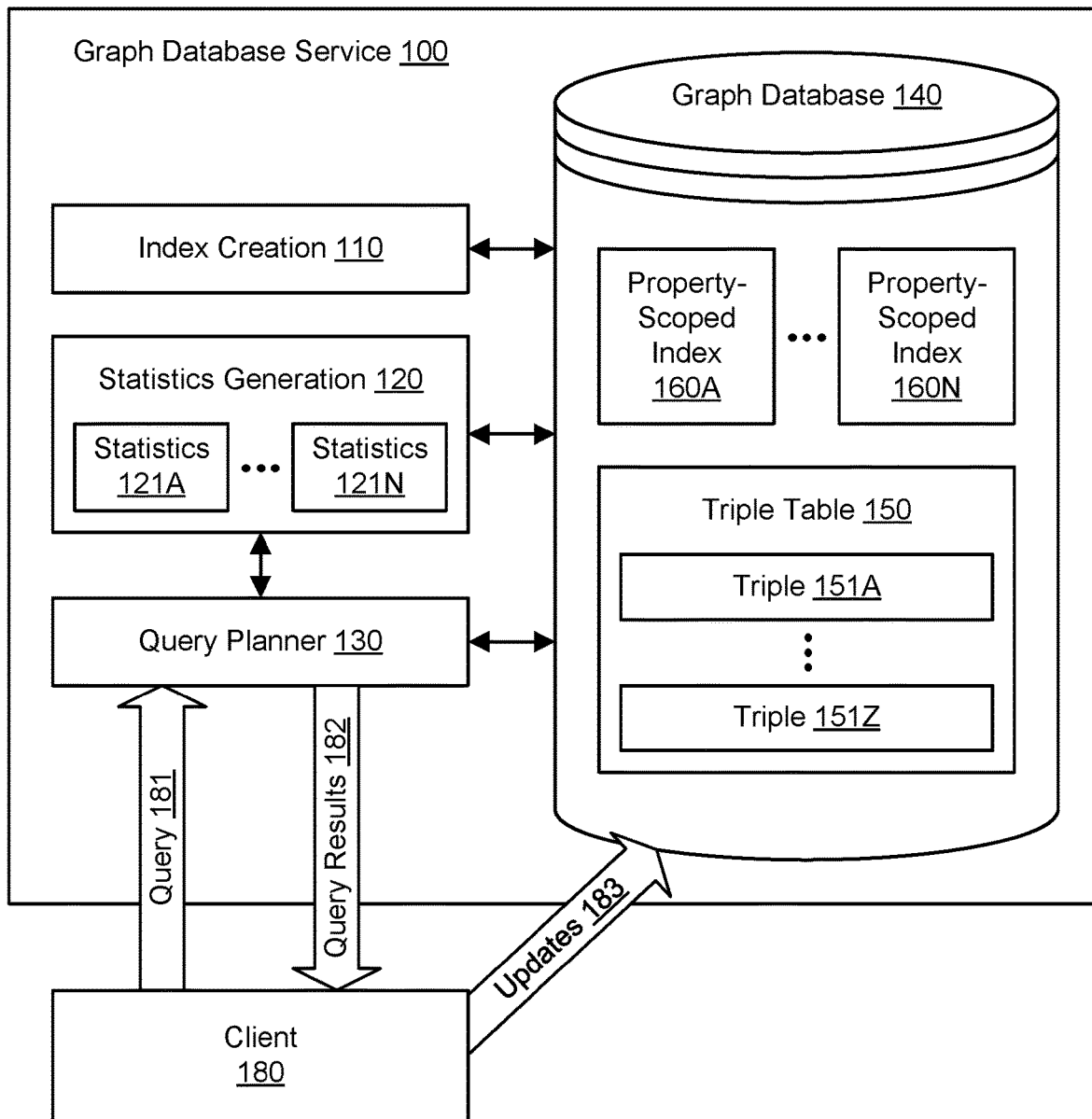
FIG. 1 illustrates an example system environment for global column indexing in a graph database, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for query language interoperability in a graph database are described. In one embodiment, a graph database stores data elements using an internal data model. In one embodiment, for example, the internal data model may represent data elements using triples, and a triple may include a subject identifier, a column name, and a value. In one embodiment, the triples in the graph database may be used to represent nodes and edges (relationships) in a graph of connected items. In one embodiment, the graph database may provide access to data elements using a plurality of query languages, and the data models associated with the query languages may differ from the internal data model. In one embodiment, the graph database may support queries expressed in a graph database query language typically used for semantic queries and whose data model represents the data elements as resource description framework (RDF) triples comprising subjects, predicates, and objects. In one embodiment, the graph database may support queries expressed in a graph database query language typically used for graph traversal queries and whose data model represents the data elements as property graphs. In one embodiment, the graph database may provide interoperability for the multiple query languages and the corresponding multiple data models. For example, in one embodiment, a query expressed in a first query language may insert data elements into the graph database, where the inserted data elements are mapped from a first data model to the internal data model; the same data elements may be retrieved using a query expressed in a second query language, where the retrieved data elements are mapped from the internal data model to a second data model. In one embodiment, a graph database may provide users with a variety of features associated with different query languages while maintaining the underlying data using a unified, common storage scheme.

In one embodiment, columns in the internal data model are strongly typed such that values in a particular column may share the same data type. In one embodiment, column names are globally scoped in the internal data model of the graph database, such that the same column name may not be represented more than once in the graph database and may not be limited to a particular sub-table of the graph database. In one embodiment, the graph database service uses a partitioned indexing scheme to enable querying of the graph database. In one embodiment, indices are created and maintained for global columns in the primary table in the graph database. In one embodiment, a per-column index may be a table or other columnar data structure that includes multiple rows, and each row may include the values associated with the column corresponding to the index. In one embodiment, the indices may effectively be partitioned by column name. In one embodiment, the generation and maintenance of indices is performed by the graph database service automatically, e.g., without being directly prompted by user input directing the indexing tasks. In one embodiment, the per-column indices are used to perform queries of the graph database. In one embodiment, to perform a query, a query planner may refer to the indices corresponding to columns associated with the query. In one embodiment, statistics are generated and maintained for the indices in order to optimize queries. In one embodiment, the statistics for an index may represent distributions of values within the corresponding column. In one embodiment, to optimize a query, the order of indices to be used may be determined based (at least in part) on the statistics for the per-column indices. In one embodiment, statistics may be maintained automatically and in real time or near-real time to enable optimized query processing using up-to-date information.

FIG. 1 illustrates an example system environment for global column indexing in a graph database, according to one embodiment. In one embodiment, a graph database service 100 stores elements of data in a graph database 140. In one embodiment, the graph database may also be referred to as a graph data store or a triple store. In one embodiment, a graph represented by the graph database service 100 is a data structure that is suitable for representing relationships, connections, and dependencies within data. In one embodiment, typical examples of domains in which graphs can model data may include social networks or communication networks, biological networks, time series applications, and metadata management. In one embodiment, a graph may include nodes (vertices) and edges (relationships) as well as properties associated with those vertices and edges. In one embodiment, a node may represent a concept or an object. In one embodiment, an edge may represent a relationship between vertices. In one embodiment, a vertex may have various properties such as a name. In one embodiment, an edge may have various properties such as a type of relationship. In one embodiment, for example, in a graph within a social network, User1, User2, and User3 may be entities, and a "friendOf" relationship between them may define the "edges" of this small graph. In one embodiment, the User1, User2, and User3 entities may have properties like "name" and "age," and the relationship properties may include "start date," "source," and so on. In one embodiment, large volumes of such connected data may be generated from modern applications, mobile and messaging apps, and IoT devices. In one embodiment, such data tends to be dynamic, such that the relationships, entities, and their properties may be constantly changing.

Schema-based relational data stores may not be able to change rapidly enough; schema-less stores like key-value stores may be unable to work with sophisticated query languages. Traditional key-value data stores and relational data stores may often be unwieldy for managing data that is rich and highly connected. In one embodiment, for example, key-value stores may support accessing discrete objects that do not necessarily represent rich data or relationships. As another example, relational data stores may be too inflexible to adequately represent the fluid relationships in highly connected data. When relational databases are used to store such data, developers may be required to store the data in tables with rigid structures and write complex SQL queries using multiple joins. Such complex queries may prove difficult to maintain and may not scale adequately when run on large datasets. As the data scale increases, some graphs may become billion-edge structures that challenge prior hardware and software solutions. In one embodiment, the graph database service 100 may query such data efficiently using per-column (property-scoped) indices 160A-160N. Although indices 160A-160N are illustrated for purposes of example, any suitable number and configuration of indices may be used in the graph database in various embodiments.

In one embodiment, the elements of data in the graph database may represent triples or rows in a columnar format. In one embodiment, triples such as triples 151A through 151Z may be stored in a triple table 150; the triple table may represent a primary table in the graph database. Although triples 151A-151Z are illustrated for purposes of example, any suitable number and configuration of triples may be used in the graph database in various embodiments. In one embodiment, for example, a triple may include an identifier, a column name, and a value. In one embodiment, triples may include different elements than (e.g., in addition to or instead of) an identifier, column name, and value. In one embodiment, the identifier may also be referred to as a subject identifier. In one embodiment, the identifier may indicate the particular row (e.g., in a relational view of the data) or record that holds the combination of the column name and the value in the triple. In one embodiment, the same subject identifier may be reused for multiple triples, e.g., if the corresponding row or record includes values in multiple categories. In one embodiment, the column name may indicate a distinct and separate category of data, and the value may represent one of the allowable values within the category. In one embodiment, the triples in a graph database may be used to represent nodes and edges (relationships) in a graph of connected items. In one embodiment, the graph database may store one graph or multiple graphs. In one embodiment, the triples are also stored with graph identifiers that indicate particular graphs or sub-graphs to which the triples belong.

In one embodiment, columns are strongly typed such that values in a particular column may share the same data type, and an enforcement mechanism may ensure that values in the particular column are limited to being expressed in the data type associated with the column. In one embodiment, data types may differ from column to column. In one embodiment, all the rows and columns in the graph database may effectively belong to the same primary table, e.g., the triple table. In one embodiment, column names are globally scoped in the graph database, such that the same column name may not be represented more than once in the graph database and may not be limited to a particular sub-table of the graph database. In one embodiment, by way of contrast, column names in a conventional relational database are typically locally scoped to one of many tables.

In one embodiment, the graph database service 100 uses a partitioned indexing scheme to enable querying of the graph database. In one embodiment, an index creation component 110 may create and maintain indices for every global column in the primary table in the graph database. In one embodiment, the index creation component 110 may create and maintain indices for many but not necessarily all global columns in the primary table in the graph database, e.g., for columns that are intended to be queryable or searchable. In one embodiment, a per-column index may be a table or other columnar data structure that includes multiple rows, and each row may include the values associated with the column corresponding to the index. In one embodiment, a per-column index may also be referred to as a property-scoped index. In one embodiment, each row in a per-column index also includes a pointer to the corresponding row in the primary table in the graph database. In one embodiment, the indices 160A-160N may be stored as separate data structures from each other and from the triple table 150, e.g., in storage managed by or otherwise accessible to the graph database service 100. In one embodiment, the indices may effectively be partitioned by column name. In one embodiment, by way of contrast, such per-column indexing in a conventional relational database would often be prohibitively expensive due to the vastly greater number of locally scoped columns that may be managed in a relational database management system. In one embodiment, the generation and maintenance of indices is performed by the graph database service 100 automatically, e.g., without being directly prompted by user input directing the indexing tasks. In one embodiment, by way of contrast, the generation and maintenance of indices for a conventional relational database is typically a manual task that requires user input to customize the indices.

In one embodiment, the per-column indices are used to perform queries of the graph database. In one embodiment, a client 180 may supply a query 181 and receive query results 182 from the graph database service 100. In one embodiment, to perform a query, a query planner 130 may refer to the indices corresponding to columns associated with the query. In one embodiment, a statistics generation component 120 generates and maintains statistics for the indices in order to optimize queries. In one embodiment, the statistics generation component 120 generates and maintains sets of statistics corresponding to individual indices, such as statistics 121A-121N corresponding to the indices 160A-160N. In one embodiment, the statistics may be stored using any suitable storage technologies, e.g., in storage managed by or otherwise accessible to the graph database service 100. In one embodiment, the statistics for an index may represent distributions of values within the corresponding column. In one embodiment, for example, the statistics may indicate how many times a particular value occurs within the column, how many triples having numeric values within a particular numeric range occur within the column, how many triples having string-typed values beginning with a particular character occur within the column, and so on.

In one embodiment, to optimize a query, the order of indices to be used may be determined based (at least in part) on the statistics for the per-column indices. In one embodiment, the query planner 130 uses the most constraining index first, then the next most constraining index, and so on. In one embodiment, the statistics may be maintained in real time or near-real time to enable optimized query processing using up-to-date information. In one embodiment, the generation and maintenance of statistics for an index is performed by the graph database service 100 automatically, e.g., without being directly prompted by user input directing the statistics tasks. In one embodiment, the client 180 may supply updates 183 to triples in the graph database. In one embodiment, an index and the statistics for the index are generated or updated by the graph database service 100 in response to the updating of one or more triples for the corresponding column in the graph database (e.g., the addition of one or more triples, the deletion of one or more triples, or the modification of one or more triples). In one embodiment, the graph database service 100 provides a query hint mechanism to optimize the performance of individual queries within specific applications.

In one embodiment, queries of the graph database include semantic queries. In one embodiment, a semantic query may permit the retrieval of both explicitly and implicitly derived information from the graph database based on syntactic, semantic, and structural information embodied in the database. In one embodiment, a semantic query may return a specific or precise result such as a single piece of information. In one embodiment, a semantic query may return an answer to a "fuzzier" or less specific question through pattern matching and machine logic. In one embodiment, by operating on the triples in the graph database, a semantic query may process the actual relationships between information and determine an answer from the network of connections in the graph database. In one embodiment, a semantic query may operate on structured data and utilize features such as operators (e.g., >, <, and =), pattern matching, and so on. In one embodiment, semantic queries of the graph database are formatted in the syntax of a semantic query language such as SPARQL. In one embodiment, a semantic query may be written without knowledge of a database schema in the graph database. In one embodiment, a query of the graph database may be expressed in a graph traversal language or graph query language such as Neo4j or Gremlin.

In one embodiment, the graph database is designed to effectively capture and analyze rich, dynamic data structures having complex relationships. In one embodiment, for example, a simple social query such as "find all the friends of User1's friends" may be expressed as a one-line traversal in a graph database in a graph traversal language such as Gremlin: g.V( ).has('name1','User1').out('friend').out ('friend').values('name'). However, using an SQL query to retrieve the same information from a relational database may be much more complex, such as the following query:

SELECT p1.Person AS PERSON, p2.Person AS FRIEND_OF_FRIEND
FROM PersonFriend pf1 JOIN Person p1
ON pf1.PersonID=p1.ID JOIN PersonFriend pf2
ON pf2.PersonID=pf1.FriendID JOIN Person p2
ON pf2.FriendID=p2.ID
WHERE p1.Person='User1' AND pf2.FriendID <>p1.ID In one embodiment, the graph database service 100 may support a simple text search on property values. In one embodiment, in the property graph model, the text search may search over node and edge properties. In one embodiment, in the resource description framework (RDF) model, the text search may search over literal values. In one embodiment, the graph database service 100 may employ logic to efficiently compress and store the data so that the storage costs are lowered.

In one embodiment, the graph database service 100 may be used by clients in varying domains such as social networks, recommendation engines, data management, network and IT management, fraud detection, medical applications, Online Transaction Processing (OLTP) and Online Analytics Processing (OLAP) workloads, and so on. In one embodiment, the graph database service 100 may be used for processing of streaming data that is rich (e.g., representing a large amount of information) and highly connected (e.g., representing many relationships). In one embodiment, for example, clients in the financial sector may use the graph database service 100 to process a stream of credit card transactions as graph queries to identify potential anomalies.

In one embodiment, as a more specific example, a client of the graph database service 100 may supply a graph query to detect a purchase that takes place in one geographical region and is followed by one in another geographical region five minutes later. In one embodiment, detecting that a customer had two transactions that occurred closely together, but took place thousands of miles apart, the client of the graph database service 100 may generate an alert and send it to the customer. In one embodiment, as another example, the graph database service 100 may be used by a retail company to make purchase recommendations for a customer based on purchasing behavior of the customer's friends. In one embodiment, as yet another example, the graph database service 100 may be used by a life sciences organization to analyze the relationships between different chemicals and compounds to detect drug interactions.

In one embodiment, the graph database service 100 may be used by clients for combining and analyzing the large quantities of relationship information aggregated in the clients' OLTP and OLAP applications. In one embodiment, beyond short interactive queries (e.g., for OLTP) and longer-running complex queries (e.g., for OLAP), graph analytics using the graph database service 100 may produce new insights by analyzing entire collections of relationships. In one embodiment, graph analytics may use iterative algorithms to process very large graphs and mine them for new information. In one embodiment, examples of such graph analytics may include using search engine algorithms for detecting web page relevance, using a community detection algorithm to detect groups of similar users from a large social network, and executing a shortest path algorithm to find the lowest cost route from point A to point B on a network of roads. Such tasks may be computationally challenging for conventional databases (e.g., relational databases) because they often require visiting all of the relationships (edges) in the graph multiple times to converge on a result.

In one embodiment, the graph database service 100 supports incoming and outgoing streams of graph data. In one embodiment, the graph database service 100 may be used in conjunction with machine-learning and deep-learning applications and services such that relationship-rich data in the graph database can be analyzed to identify areas in which to use machine-learning algorithms. In one embodiment, the graph database service 100 may be used to represent and scale knowledge graphs. In one embodiment, the graph database service 100 provides native support for processing large quantities of relationship information. In one embodiment, the graph database service 100 natively supports both the property graph and resource description framework (RDF) graph models to permit flexibility in modelling data on behalf of clients. In one embodiment, queries may explore small parts of the graph (e.g. OLTP applications such as recommendation systems), explore large parts of the graph (e.g., lightweight OLAP applications such as fraud detection), or examine the whole graph repeatedly (e.g., graph analytics such as determining relevance via page rank).

In one embodiment, the graph database service 100 provides support for multiple availability zones within a provider network; if the primary cluster node fails, the graph database service 100 may automatically detect the failure, select one from the available standby cluster nodes, and promote the standby to become the new primary. In one embodiment, the graph database service 100 may propagate the DNS changes of the promoted replica so that the client's application can keep writing to the primary endpoint. In one embodiment, the graph database service 100 may also provision a new node to replace the promoted standby node in the same availability zone of the failed primary one. In case the primary node failed due to temporary availability zone disruption, the new replica may be launched automatically by the graph database service 100 once that availability zone has recovered. In one embodiment, the graph database service 100 supports snapshots (automatic and on-demand) that can be restored via the console and application programming interface (API).

In one embodiment, the client 180 may encompass any type of client suitable to submit data and requests to the graph database service 100. In one embodiment, the client may be one of many clients of the graph database service 100. In one embodiment, the client may include one or more services or applications that seek to make use of the graph database service 100. In one embodiment, the client may convey network-based service requests to the service via one or more networks. In various embodiments, the network(s) may encompass any suitable combination of networking hardware and protocols necessary to establish network-based communications between the client and the graph database service 100. In one embodiment, for example, the network(s) may generally encompass the various telecommunications networks and service providers that collectively implement the Internet. In one embodiment, the network(s) may also include private networks such as local area networks (LANs) or wide area networks (WANs) as well as public or private wireless networks. In one embodiment, for example, both the client and the graph database service 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client and the Internet as well as between the Internet and the graph database service 100. In one embodiment, the client may communicate with the graph database service 100 using a private network rather than the public Internet.

Figure 14:
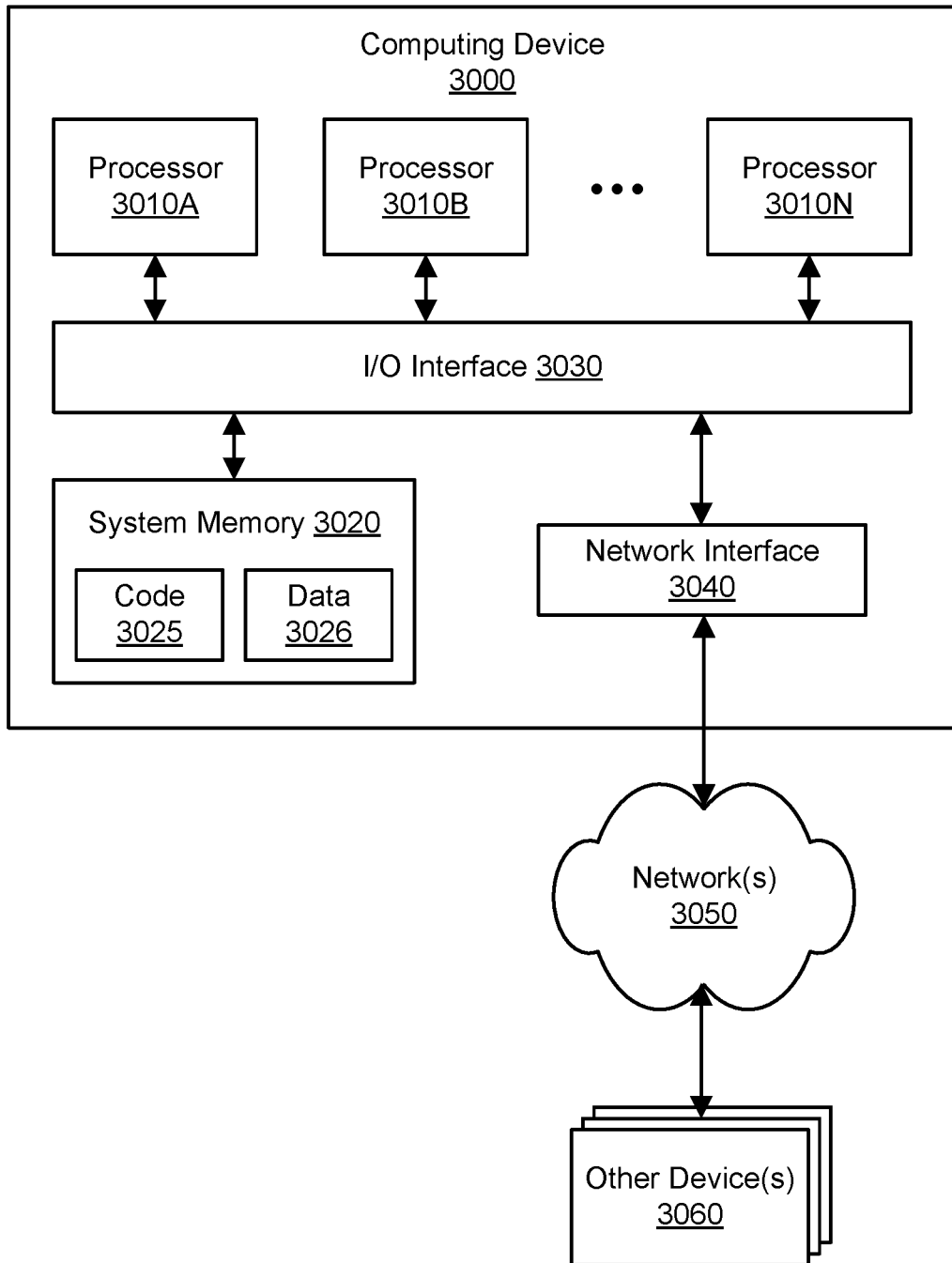
FIG. 14 illustrates an example computing device, according to one embodiment.

In one embodiment, the graph database service 100 may include one or more computing devices, any of which may be implemented by the example computing device 3000 illustrated in FIG. 14, and any suitable storage resources. Similarly, in one embodiment, the client may be implemented using the example computing device 3000 illustrated in FIG. 14. In various embodiments, portions of the described functionality of the service 100, database 140, and/or client 180 may be provided by the same computing device or by any suitable number of different computing devices. In one embodiment, if any of the components are implemented using different computing devices, then the components and their respective computing devices may be communicatively coupled, e.g., via a network. In one embodiment, each of the illustrated components (such as the graph database service 100 and its constituent components) may represent any combination of software and hardware usable to perform their respective functions. In various embodiments, the graph database service 100 and/or graph database may include additional components not shown, fewer components than shown, or different combinations, configurations, or quantities of the components shown.

Figure 2A:
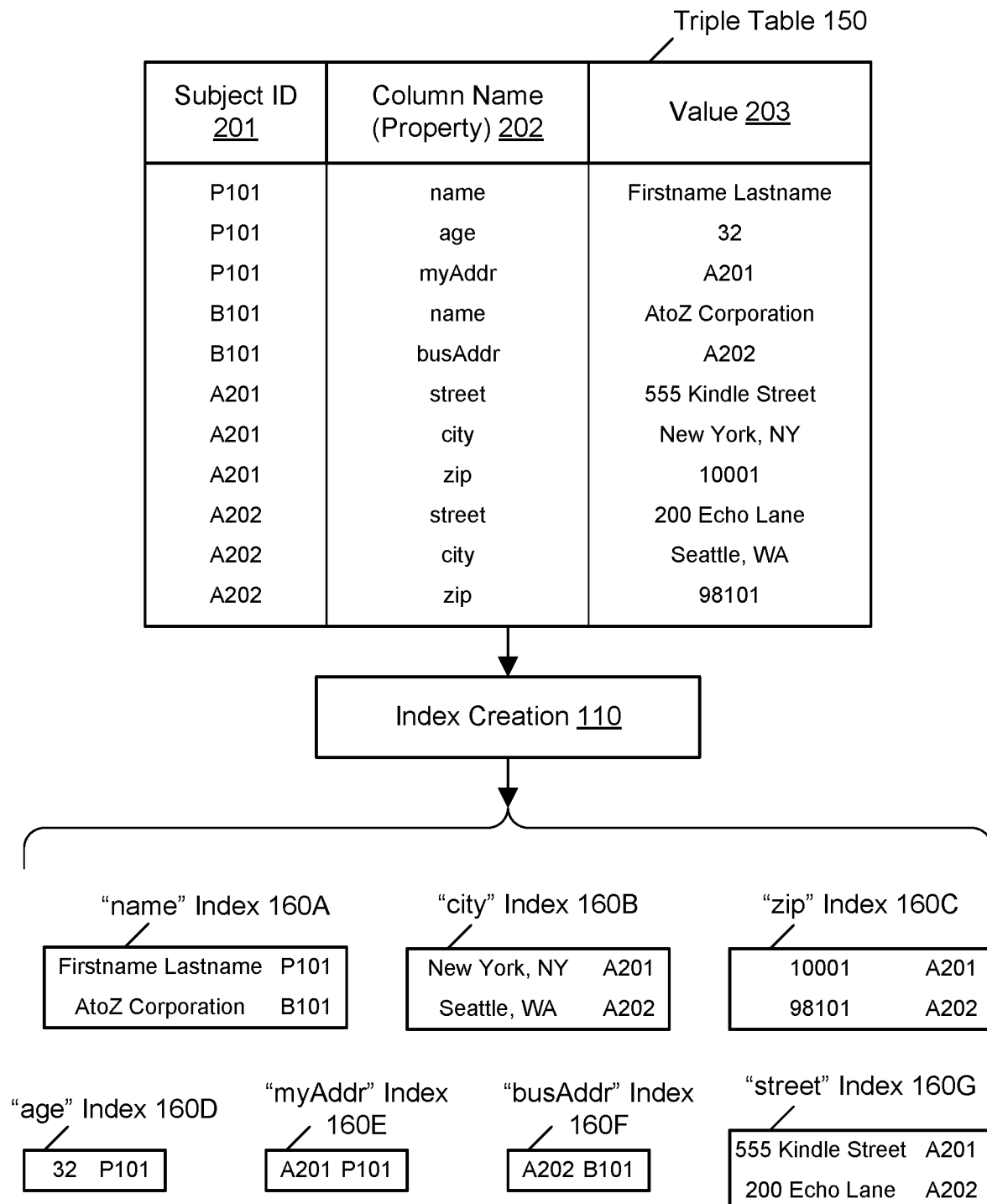
FIG. 2A through FIG. 2C illustrate examples of a graph database usable with the example system environment, including the creation of per-column indices for globally scoped column names, according to one embodiment.

FIG. 2A illustrates an example of a graph database usable with the example system environment, including the creation of per-column indices for globally scoped column names, according to one embodiment. In one embodiment, the graph database service 100 stores data as triples in a triple table 150. In one embodiment, the triples used in the graph database service 100 may differ from the triples in the RDF graph model, in which a triple may include a subject, predicate, and an object. In one embodiment, the storage model used by the graph database service 100 can effectively store and process both the property graph model and the RDF model using its internal triples structure. In one embodiment, in the illustrated example, the triple table includes at least the illustrated eleven triples. In one embodiment, the triples include subject identifiers 201, column names or properties 202, and values 203 associated with the column names or properties. In one embodiment, the subject identifiers may be referred to as identifiers or row identifiers. In one embodiment, the identifiers 201 may indicate the particular row (e.g., in a relational view of the data) or record that holds the combination of the column name and the value in the triple. In one embodiment, as shown in the example of FIG. 2A, the same subject identifier may be reused for multiple triples, e.g., if the corresponding row or record includes values in multiple categories. In one embodiment, the column names or properties 202 may indicate a distinct and separate category of data, and the values 203 may represent one of the allowable values within the category. In one embodiment, the triples in the triple table may be used to represent nodes and edges (relationships) in a graph of connected items. In one embodiment, for example, the rows including identifier P101 may represent a node for a particular person having properties such as the name "Firstname Lastname" and the age 32. In one embodiment, the node for identifier P101 may also be connected to a node for a personal address (myAddr) A201. In one embodiment, as shown in the example, the address A201 has additional triples in the triple table indicating values for street address, city, and zip code properties. Similarly, in one embodiment, the rows including identifier B101 may represent a node for a particular business having properties such as the name "AtoZ Corporation" and a connection to a node for a business address (busAddr) A202.

In one embodiment, columns are strongly typed such that values in a particular column may share the same data type, and an enforcement mechanism may ensure that values in the particular column are limited to being expressed in the data type associated with the column. In one embodiment, data types may differ from column to column. In one embodiment, as shown in the example of FIG. 2A, the "name" column may be associated with a string data type, while the "zip" column may be associated with a numeric data type. In one embodiment, clients are permitted to create columns that appear to be locally scoped but are actually implemented in the graph database with a global scope, e.g., by automatically appending an additional term to a potentially non-unique column name to ensure that the combination is unique in the graph database.

In one embodiment, the index creation component may create and maintain indices for every global column in the triple table. In one embodiment, the index creation component may create and maintain indices for many but not necessarily all global columns in the triple table, e.g., for columns that are intended to be queryable or searchable. In one embodiment, as shown in the example of FIG. 2A, the index creation component may create and maintain a "name" index 160A corresponding to the column name or property "name," a "city" index 160B corresponding to the column name or property "city," a "zip" index 160C corresponding to the column name or property "zip," an "age" index 160D corresponding to the column name or property "age," a "myAddr" index 160E corresponding to the column name or property "myAddr," a "busAddr" index 160F corresponding to the column name or property "busAddr," and a "street" index 160G corresponding to the column name or property "street." In one embodiment, the per-column or property-scoped indices 160A-160G may be tables or other columnar data structures that include one or more rows, and each row may include the values associated with the column corresponding to the index. In one embodiment, each row in a per-column index also includes a pointer to the corresponding row in the primary table in the graph database; the pointer may take the form of a subject identifier. In one embodiment, the indices may effectively be partitioned by column name. In one embodiment, by way of contrast, such per-column indexing in a conventional relational database would often be prohibitively expensive due to the vastly greater number of locally scoped columns that may be managed in a relational database management system. In one embodiment, the generation and maintenance of indices is performed by the graph database service 100 automatically, e.g., without being directly prompted by user input directing the indexing tasks. In one embodiment, by way of contrast, the generation and maintenance of indices for a conventional relational database is typically a manual task that requires user input to customize the indices.

Figure 2B:
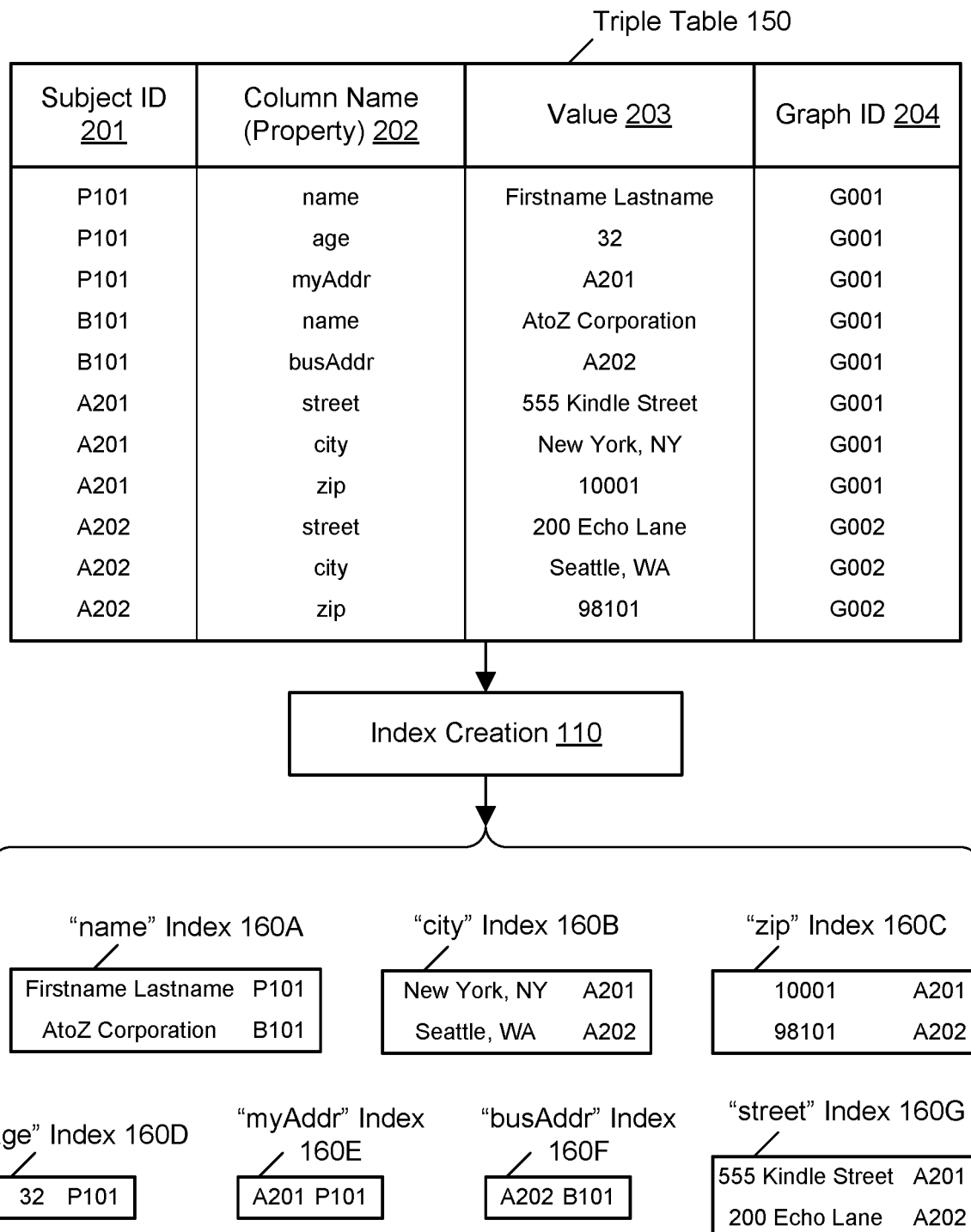
Figure 2C:
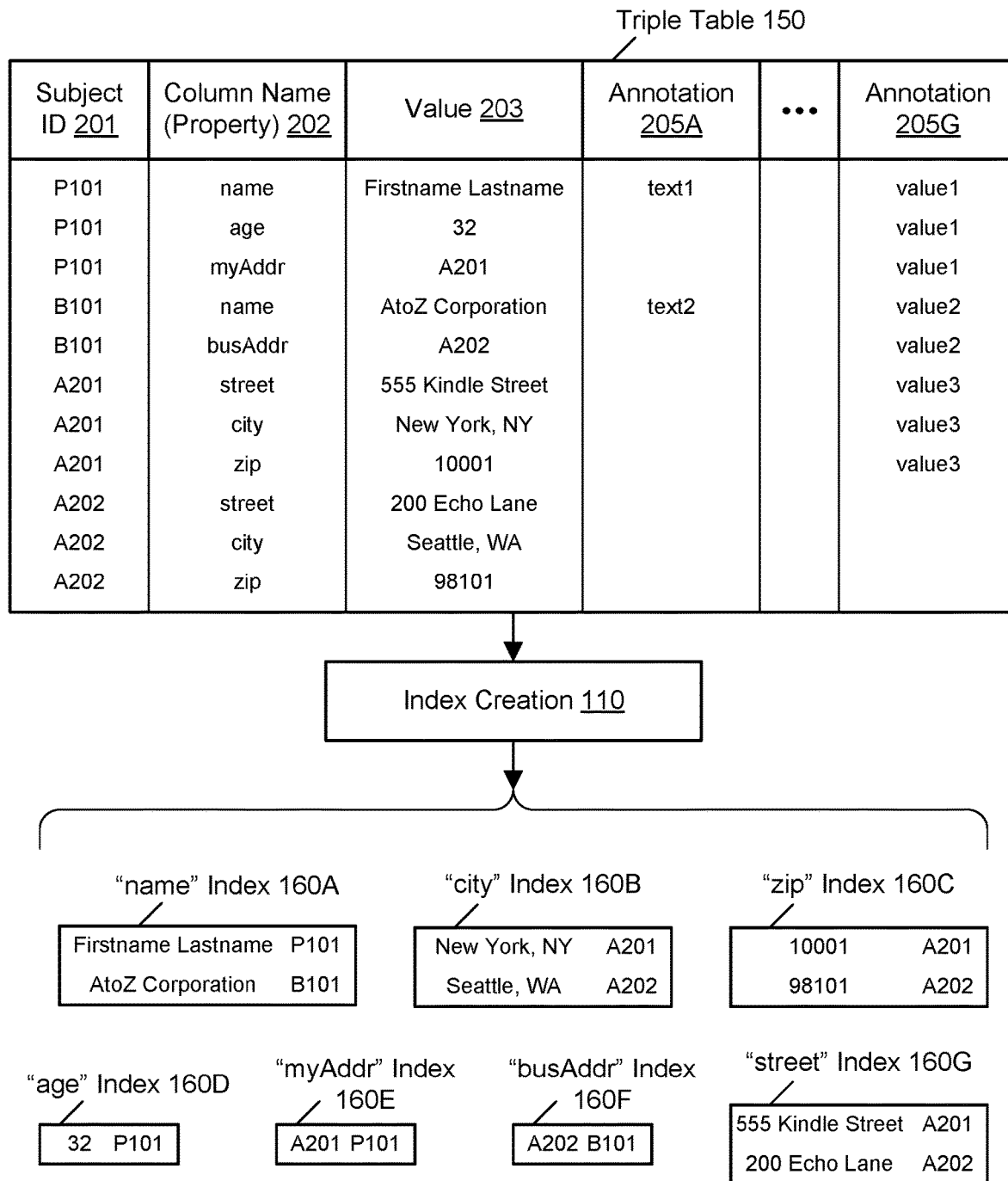

In various embodiments, the data elements in the graph database may include elements in addition to the subject identifiers, column names (also known as properties or predicates), and values (also known as objects or relationships). In one embodiment, the data elements may be referred to as quads, e.g., when each row potentially stores four different units of data. As illustrated in FIG. 2B, in one embodiment, the data elements also include graph identifiers 204 that indicate particular graphs or sub-graphs to which the triples belong. As illustrated in FIG. 2C, in one embodiment, the data elements also include one or more types of annotations 205A-205G. In one embodiment, the triple table 150 stores annotations that characterize aspects of the triples, such as the values in the triples. As shown in the example of FIG. 2C, in one embodiment, a series of annotation fields such as annotation 205A through 205G may be stored in the triple table. However, any suitable number and configuration of annotation fields may be used in the graph database in various embodiments. In various embodiments, the annotations may represent user-defined or user-supplied values for aspects of data such as data quality values, access rights, expiration times, and so on. In one embodiment, for a given annotation field, not all of the triples or rows may include a value for that annotation field. In the example shown in FIG. 2C, in one embodiment, only the "P101"—"name"—"Firstname Lastname" and "B101"—"name"—"AtoZ Corporation" triples include values for the annotation field 205A. Also in the example shown in FIG. 2C, in one embodiment, a greater number of the triples happen to have values for the annotation field 205G.

Figure 3:
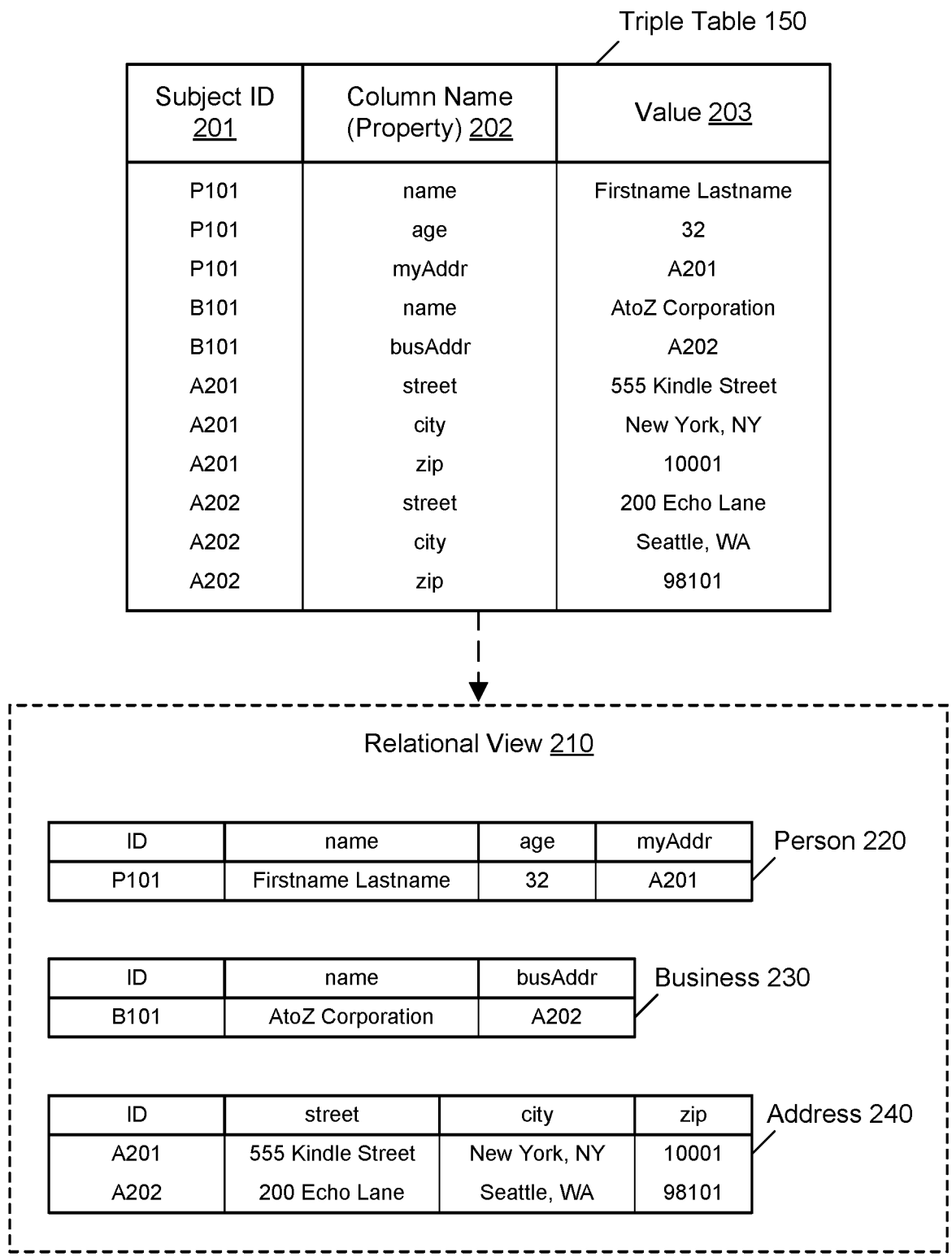
FIG. 3 illustrates an example of a graph database usable with the example system environment, including a relational view of data elements in the graph database, according to one embodiment.

FIG. 3 illustrates an example of a graph database usable with the example system environment, including a relational view of data elements in the graph database, according to one embodiment. In one embodiment, the graph database is sufficiently flexible to describe rich interrelated object and relationship centric data while also achieving query performance using property-scoped, strongly typed indices. In one embodiment, as shown in the example of FIG. 3, the graph database may reflect or represent a relational view 210 of data along with its associated per-column, property-scoped indices. In one embodiment, for example, the rows including identifier P101 may represent a row in the relational view for a particular person 220 having properties such as the name "Firstname Lastname," the age 32, and the personal address (myAddr) A201. Similarly, in one embodiment, the rows including identifier B101 may represent a row in the relational view for a particular business 230 having properties such as the name "AtoZ Corporation" and a business address (busAddr) A202. In one embodiment, the relational view may also include a table for the addresses 240 referenced in the person 220 and business 230 rows.

Figure 4:
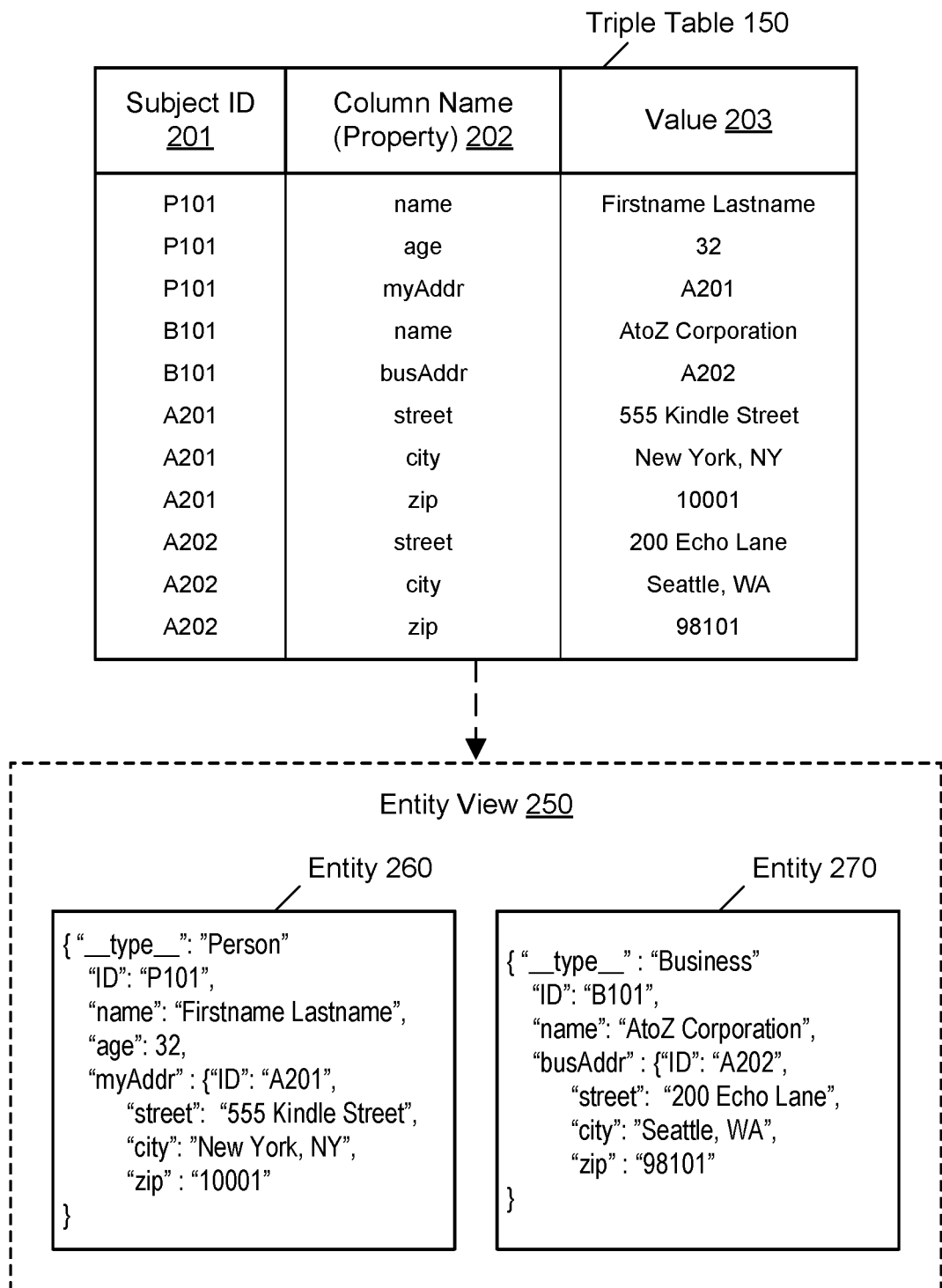
FIG. 4 illustrates an example of a graph database usable with the example system environment, including an entity view of data elements in the graph database, according to one embodiment.

FIG. 4 illustrates an example of a graph database usable with the example system environment, including an entity view of data elements in the graph database, according to one embodiment. In one embodiment, the graph database may reflect or represent an entity view 250 of data along with its associated per-column, property-scoped indices. In one embodiment, the entity view may include one or more entities expressed according to JavaScript Object Notation (JSON). In one embodiment, for example, the rows including identifier P101 may represent an entity 260 in the entity (JSON) view for a particular person having properties such as the name "Firstname Lastname," the age 32, and the personal address (myAddr) A201 with nested values for a city, street, and zip code. Similarly, in one embodiment, the rows including identifier B101 may represent another entity 270 in the entity (JSON) view for a particular business having properties such as the name "AtoZ Corporation" and a business address (busAddr) A202 with nested values for a city, street, and zip code.

Figure 5:
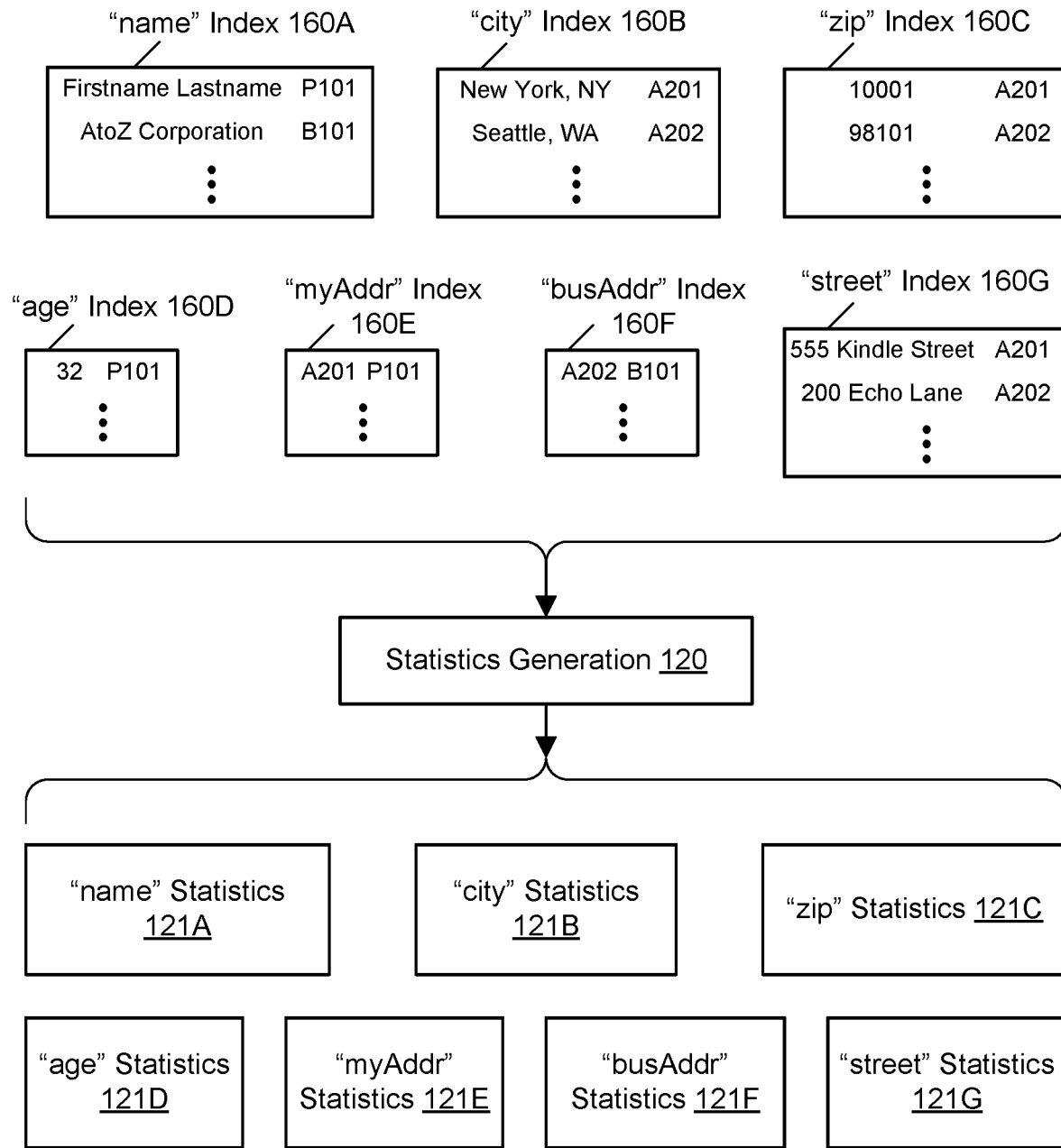
FIG. 5 illustrates the generation of statistics associated with per-column indices for globally scoped column names, according to one embodiment.

FIG. 5 illustrates the generation of statistics associated with per-column indices for globally scoped column names, according to one embodiment. As previously shown in the example of FIG. 2, in one embodiment, the index creation component may create and maintain a "name" index 160A corresponding to the column name or property "name," a "city" index 160B corresponding to the column name or property "city," a "zip" index 160C corresponding to the column name or property "zip," an "age" index 160D corresponding to the column name or property "age," a "myAddr" index 160E corresponding to the column name or property "myAddr," a "busAddr" index 160F corresponding to the column name or property "busAddr," and a "street" index 160G corresponding to the column name or property "street." In one embodiment, the statistics generation component generates and maintains statistics for the indices 160A-160G in order to optimize queries. In one embodiment, the statistics are incrementally generated by being updated periodically as triples are added, deleted, or modified. In one embodiment, the statistics generation component generates and maintains sets of statistics corresponding to individual indices, such as statistics 121A-121G corresponding to the indices 160A-160G. In one embodiment, the statistics may be stored using any suitable storage technologies, e.g., in storage managed by or otherwise accessible to the graph database service 100. In one embodiment, the statistics for an index may represent distributions of values within the corresponding column. In one embodiment, for example, the statistics may indicate how many times a particular value occurs within the column, how many triples having numeric values within a particular numeric range occur within the column, how many triples having string-typed values beginning with a particular character occur within the column, and so on.

In one embodiment, to optimize a query, the order of indices to be used may be determined based (at least in part) on the statistics 121A-121G for the per-column indices 160A-160G. In one embodiment, the query planner 130 uses the most constraining index first, then the next most constraining index, and so on. In one embodiment, the statistics may be maintained in real time or near-real time to enable optimized query processing using up-to-date information. In one embodiment, the generation and maintenance of statistics for an index is performed by the graph database service 100 automatically, e.g., without being directly prompted by user input directing the statistics tasks. In one embodiment, an index and the corresponding statistics for the index are updated by the graph database service 100 in response to the updating of one or more triples for the corresponding column in the graph database (e.g., the addition of one or more triples, the deletion of one or more triples, or the modification of one or more triples).

Figure 6:
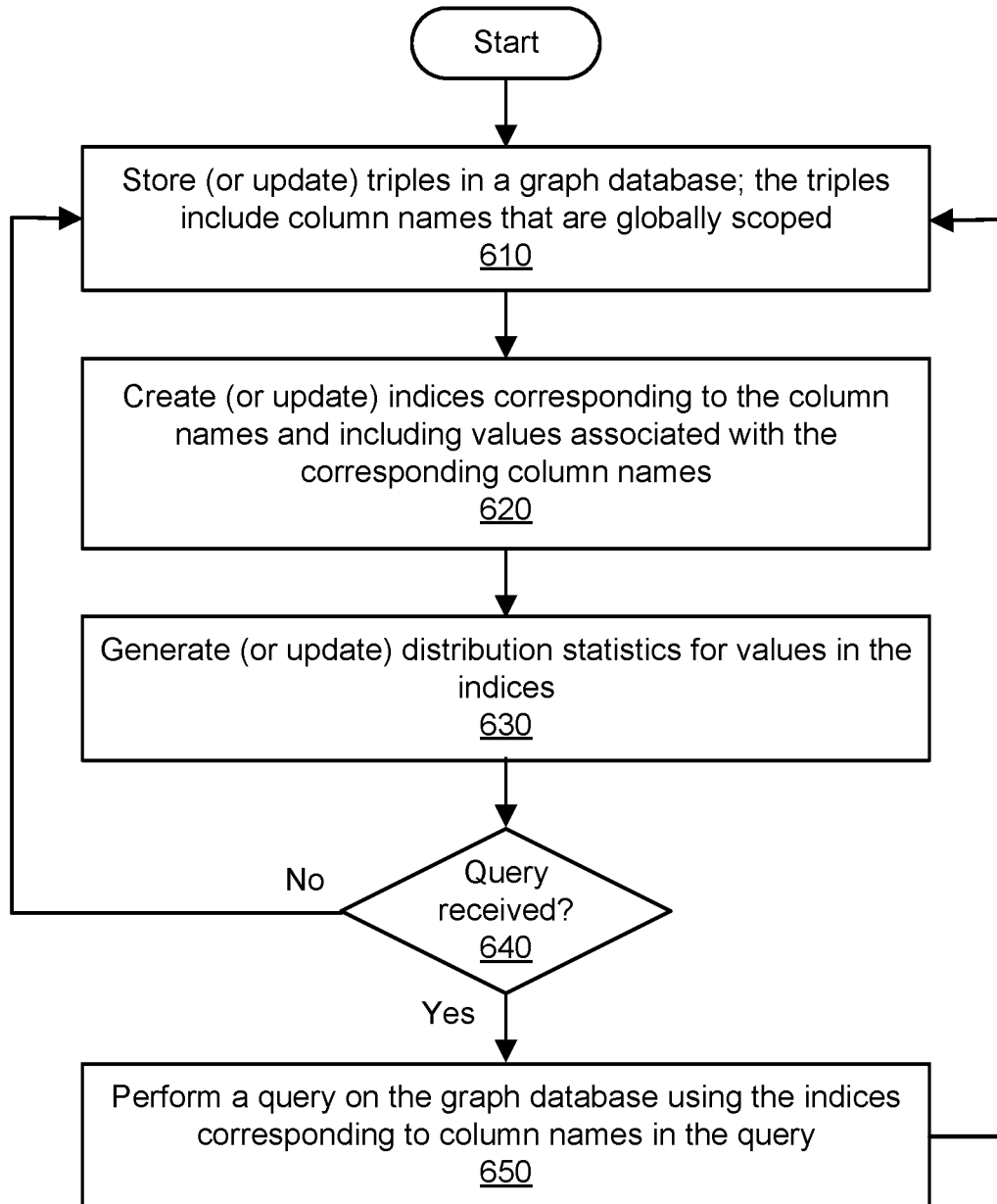
FIG. 6 is a flowchart illustrating a method for global column indexing in a graph database, according to one embodiment.

FIG. 6 is a flowchart illustrating a method for global column indexing in a graph database, according to one embodiment. In one embodiment, as shown in 610, elements of data may be stored or updated in a graph database. In one embodiment, the elements of data in the graph database may represent triples or rows in a columnar format. In one embodiment, for example, a triple may include an identifier, a column name, and a value. In one embodiment, triples may include different elements than (e.g., in addition to or instead of) an identifier, column name, and value. In one embodiment, the identifier may also be referred to as a subject identifier. In one embodiment, the identifier may indicate the particular row (e.g., in a relational view of the data) or record that holds the combination of the column name and the value in the triple. In one embodiment, the same subject identifier may be reused for multiple triples, e.g., if the corresponding row or record includes values in multiple categories. In one embodiment, the column name may indicate a distinct and separate category of data, and the value may represent one of the allowable values within the category. In one embodiment, the triples in a graph database may be used to represent nodes and edges (relationships) in a graph of connected items. In one embodiment, the graph database may store one graph or multiple graphs. In one embodiment, the triples are also stored with graph identifiers that indicate particular graphs to which the triples belong.

In one embodiment, columns are strongly typed such that values in a particular column may share the same data type, and an enforcement mechanism may ensure that values in the particular column are limited to being expressed in the data type associated with the column. In one embodiment, data types may differ from column to column. In one embodiment, all the rows and columns in the graph database may effectively belong to the same primary table. In one embodiment, column names are globally scoped in the graph database, such that the same column name may not be represented more than once in the graph database and may not be limited to a particular sub-table of the graph database. In one embodiment, by way of contrast, column names in a conventional relational database are typically locally scoped to one of many tables.

In one embodiment, as shown in 620, indices may be created or updated for the globally scoped columns in the primary table in the graph database. In one embodiment, indices are created and maintained for many but not necessarily all global columns in the primary table in the graph database, e.g., for columns that are intended to be queryable or searchable. In one embodiment, a per-column index may be a table or other columnar data structure that includes multiple rows, and each row may include the values associated with the column corresponding to the index. In one embodiment, a per-column index may also be referred to as a property-scoped index. In one embodiment, each row in a per-column index also includes a pointer to the row in the primary table in the graph database. In one embodiment, the indices may be stored as separate data structures from each other and from the primary table, e.g., in storage managed by or otherwise accessible to the graph database service. In one embodiment, the indices may effectively be partitioned by column name. In one embodiment, by way of contrast, such per-column indexing in a conventional relational database would often be prohibitively expensive due to the vastly greater number of locally scoped columns that may be managed in a relational database management system. In one embodiment, the generation and maintenance of indices is performed by the graph database service automatically, e.g., without being directly prompted by user input directing the indexing tasks. In one embodiment, by way of contrast, the generation and maintenance of indices for a conventional relational database is typically a manual task that requires user input to customize the indices.

In one embodiment, as shown in 630, statistics may be generated or updated incrementally for the indices, e.g., in order to optimize queries. In one embodiment, the statistics may be stored using any suitable storage technologies, e.g., in storage managed by or otherwise accessible to the graph database service. In one embodiment, the statistics for an index may represent distributions of values within the corresponding column. In one embodiment, for example, the statistics may indicate how many times a particular value occurs within the column, how many triples having numeric values within a particular numeric range occur within the column, how many triples having string-typed values beginning with a particular character occur within the column, and so on. In one embodiment, the statistics may be maintained in real time or near-real time to enable optimized query processing using up-to-date information. In one embodiment, the generation and maintenance of statistics for an index is performed by the graph database service automatically, e.g., without being directly prompted by user input directing the statistics tasks. In one embodiment, an index and the statistics for the index are updated by the graph database service in response to the updating of one or more triples for the corresponding column in the graph database (e.g., the addition of one or more triples, the deletion of one or more triples, or the modification of one or more triples).

In one embodiment, as shown in 640, it may be determined whether a query has been received, e.g., from a client or any user who has suitable access privileges to submit a query to the graph database service. If not, then in one embodiment, the method may await update requests to the graph database and eventually return to 610 to perform the updates (e.g., the addition of one or more triples, the deletion of one or more triples, or the modification of one or more triples). In one embodiment, if a query has been received, then as shown in 650, the query may be performed on the graph database. In one embodiment, the query is performed (e.g., by a query planner) using the indices corresponding to column names associated with the query. In one embodiment, to optimize a query, the order of indices to be used may be determined based (at least in part) on the statistics for the per-column indices. In one embodiment, the query planner uses the most constraining index first, then the next most constraining index, and so on. In one embodiment, the query may return one or more data elements from the graph database, potentially including one or more of the values.

Figure 7:
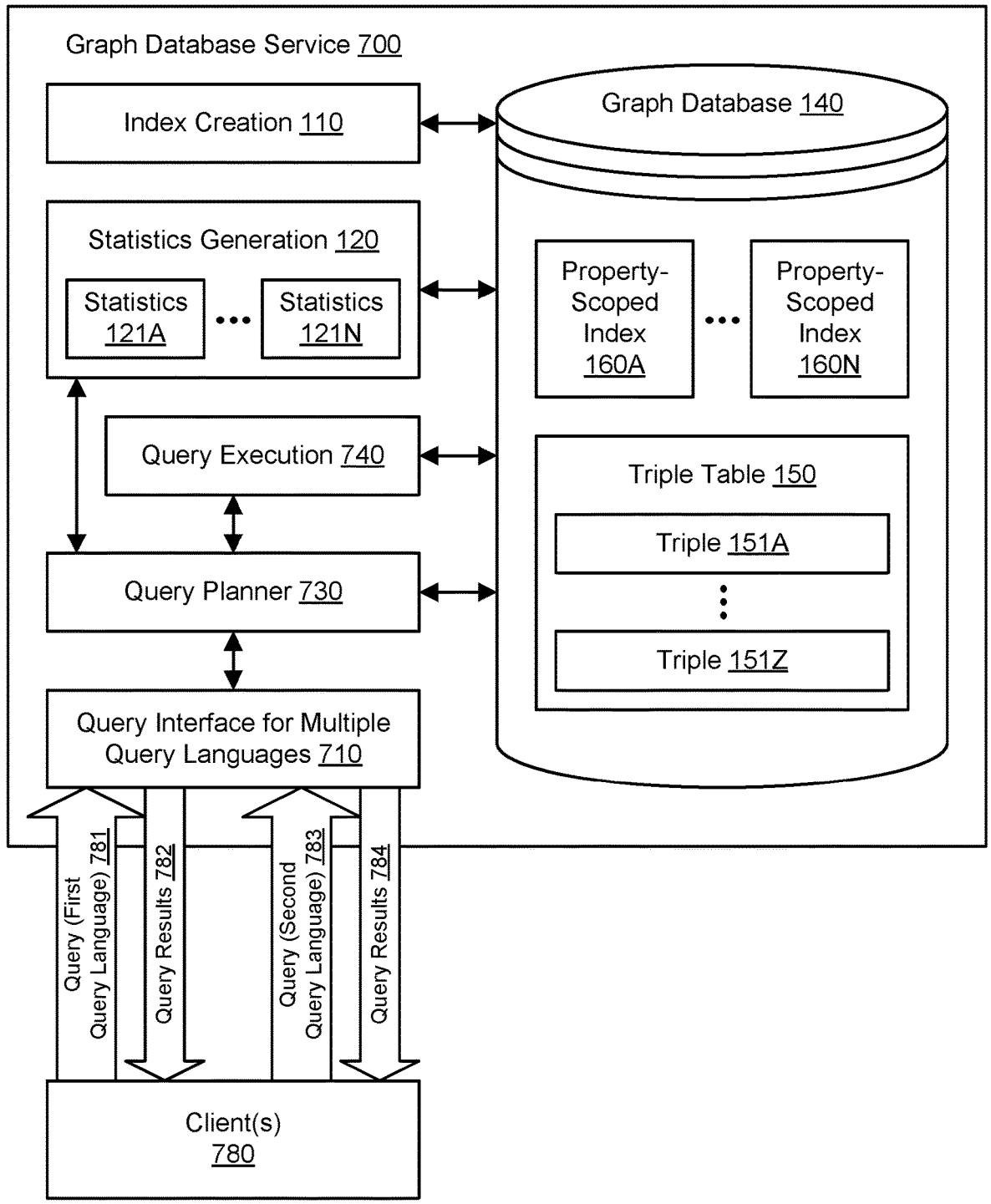
FIG. 7 illustrates an example system environment for query language interoperability in a graph database, according to one embodiment.

FIG. 7 illustrates an example system environment for query language interoperability in a graph database, according to one embodiment. In one embodiment, aspects of the graph database service 700 illustrated in FIG. 7 may be implemented as discussed above with respect to FIG. 1. In one embodiment, for example, the graph database service 700 may include the index creation component 110, the statistics generation component 120, and the graph database 140 that maintains a triple table 150 and property-scoped indices 160A-160N. In one embodiment, the graph database service 700 stores elements of data in the graph database using an internal data model. In one embodiment, the graph database service 700 provides access to such data elements using a plurality of different query languages. In one embodiment, the query languages are associated with various data models, and the data models associated with the query languages may differ from the internal data model in at least some respects.

In one embodiment, the internal data model of the graph database may represent elements of data as triples or rows in a columnar format. In one embodiment, triples such as triples 151A through 151Z may be expressed according to the internal data model and stored in the triple table; the triple table may represent a primary table in the graph database. Although triples 151A-151Z are illustrated for purposes of example, any suitable number and configuration of triples may be used in the graph database in various embodiments. In one embodiment, for example, a triple according to the internal data model may include an identifier, a column name, and a value. In one embodiment, triples in the internal data model may include different elements than (e.g., in addition to or instead of) an identifier, column, name, and value, such as annotations. In one embodiment, the identifier may also be referred to as a subject identifier. In one embodiment, the identifier may indicate the particular row (e.g., in a relational view of the data) or record that holds the combination of the column name and the value in the triple. In one embodiment, the same subject identifier may be reused for multiple triples, e.g., if the corresponding row or record includes values in multiple categories. In one embodiment, the column name may indicate a distinct and separate category of data, and the value may represent one of the allowable values within the category. In one embodiment, the triples of the internal data model may be used to represent nodes and edges (relationships) in a graph of connected items. In one embodiment, the graph database may store one graph or multiple graphs. In one embodiment, the triples of the internal data model are also stored with graph identifiers that indicate particular graphs or sub-graphs to which the triples belong.

In one embodiment, columns in the internal data model are strongly typed such that values in a particular column may share the same data type, and an enforcement mechanism may ensure that values in the particular column are limited to being expressed in the data type associated with the column. In one embodiment, data types may differ from column to column internal data model. In one embodiment, all the rows and columns in the graph database may effectively belong to the same primary table, e.g., the triple table. In one embodiment, column names in the internal data model are globally scoped in the graph database, such that the same column name may not be represented more than once in the graph database and may not be limited to a particular sub-table of the graph database. In one embodiment, by way of contrast, column names in a conventional relational database are typically locally scoped to one of many tables.

In various embodiments, the graph database service 700 may provide read (or retrieve) and write (or insert) access to the triples 151A-151Z using a variety of supported query languages. In one embodiment, the query languages may include graph database query languages that are typically associated with querying graph databases. In various embodiments, for example, the graph database service 700 may support graph database query languages such as SPARQL, Gremlin, and/or GraphQL. In one embodiment, the query languages supported by the graph database service 700 may include query languages typically associated with relational databases, such as Structured Query Language (SQL). In one embodiment, any of the supported query languages may be associated with a corresponding data model, and those data models may be mapped to and from the internal data model of the graph database. In one embodiment, the data models for the supported query languages may differ in at least some respects from the internal data model of the triple table 150. In one embodiment, the graph database service 700 may support queries expressed in a graph database query language typically used for semantic queries (e.g., SPARQL) and whose data model represents the data elements as resource description framework (RDF) triples comprising subjects, predicates, and objects. In one embodiment, the graph database service 700 may support queries expressed in a graph database query language typically used for graph traversal queries (e.g., Gremlin) and whose data model represents the data elements as property graphs.

In one embodiment, the graph database service 700 may provide interoperability for the supported query languages and the corresponding data models. For example, in one embodiment, a query expressed in a first query language may insert data elements into the graph database, where the inserted data elements are mapped from a first data model to the internal data model; the same data elements may be retrieved using a query expressed in a second query language, where the retrieved data elements are mapped from the internal data model to a second data model. Similarly, in one embodiment, a query expressed in the second query language may insert data elements into the graph database, where the inserted data elements are mapped from the second data model to the internal data model; the same data elements may be retrieved using a query expressed in the first query language, where the retrieved data elements are mapped from the internal data model to the first data model. In one embodiment, the graph database service 700 may provide users with a variety of features associated with different query languages while maintaining the underlying data 151A-151Z using a unified, common storage scheme according to an internal data model.

In one embodiment, one or more clients 780 may supply queries and receive query results from the graph database service. In one embodiment, as shown in FIG. 7, the client(s) 780 may supply a query 781 expressed in a first query language and also supply another query 783 expressed in a second query language. In one embodiment, the first and second query languages may be associated with different data models, and so the form of the two queries may differ. In one embodiment, the two queries 781 and 783 may be provided by the client(s) in any order relative to each other, or potentially in a concurrent manner. In various embodiments, the queries 781 and 783 may represent insertion and/or retrieval of data elements. In one embodiment, after the first query 781 is processed by the graph database service 700, corresponding query results 782 may be generated (based at least in part on the triple table 150) and returned to the appropriate one of the clients 780. In one embodiment, after the second query 783 is processed by the graph database service 700, corresponding query results 784 may be generated (based at least in part on the triple table 150) and returned to the appropriate one of the clients 780. In one embodiment, the query results 782 and 784 may be expressed according to the query language of the corresponding query and may thus vary in form. In one embodiment, for example, if query 781 is expressed according to the SPARQL language, then the results 782 may be returned in a SPARQL format; similarly, if query 783 is expressed according to the Gremlin language, then the results 784 may be returned in a Gremlin format. In one embodiment, the first query 781 in one query language may insert one or more data elements into the graph database, and the second query 783 in another query language (with a different data model) may retrieve the same elements (or a portion thereof) from the graph database.

In one embodiment, the graph database service 700 includes a query interface 710 that supports multiple query languages. In one embodiment, the query interface 710 represents a unified interface for receiving queries and returning query results according to a plurality of query languages that differ in their data models. In one embodiment, the query interface 710 may include any suitable elements of graphical user interfaces (GUIs), command-line interfaces (CLIs), application programming interfaces (APIs), other suitable types of user interfaces, and/or other suitable types of programmatic interfaces. In one embodiment, the query interface 710 receives queries in a variety of query languages and automatically detects the query language by identifying any keywords and/or syntax associated with the query language. In various embodiments, the query interface 710 (or another suitable component of the graph database service 700) may perform operations such as query parsing, syntactic validation, and/or semantic validation. In one embodiment, the query parsing, syntactic validation, and/or semantic validation may be specific to the query language in which the query is expressed.

In one embodiment, the graph database service 700 uses a partitioned indexing scheme to enable querying of the graph database using any of the supported query languages. In one embodiment, the index creation component 110 may create and maintain indices for every global column in the primary table in the graph database. In one embodiment, the index creation component 110 may create and maintain indices for many but not necessarily all global columns in the primary table in the graph database, e.g., for columns that are intended to be queryable or searchable. In one embodiment, a per-column index may be a table or other columnar data structure that includes multiple rows, and each row may include the values associated with the column corresponding to the index. In one embodiment, a per-column index may also be referred to as a property-scoped index. In one embodiment, each row in a per-column index also includes a pointer to the corresponding row in the primary table in the graph database. In one embodiment, the indices 160A-160N may be stored as separate data structures from each other and from the triple table 150, e.g., in storage managed by or otherwise accessible to the graph database service. In one embodiment, the indices may effectively be partitioned by column name. In one embodiment, by way of contrast, such per-column indexing in a conventional relational database would often be prohibitively expensive due to the vastly greater number of locally scoped columns that may be managed in a relational database management system. In one embodiment, the generation and maintenance of indices is performed by the graph database service 700 automatically, e.g., without being directly prompted by user input directing the indexing tasks. In one embodiment, by way of contrast, the generation and maintenance of indices for a conventional relational database is typically a manual task that requires user input to customize the indices.

In one embodiment, the graph database service 700 includes a query planner 730 that optimizes queries and generates execution plans. In one embodiment, to perform a query, the query planner 730 may refer to the indices corresponding to columns associated with the query. In one embodiment, a statistics generation component 120 generates and maintains statistics for the indices in order to optimize queries. In one embodiment, the statistics generation component 120 generates and maintains sets of statistics corresponding to individual indices, such as statistics 121A-121N corresponding to the indices 160A-160N. In one embodiment, the statistics may be stored using any suitable storage technologies, e.g., in storage managed by or otherwise accessible to the graph database service 700. In one embodiment, the statistics for an index may represent distributions of values within the corresponding column. In one embodiment, for example, the statistics may indicate how many times a particular value occurs within the column, how many triples having numeric values within a particular numeric range occur within the column, how many triples having string-typed values beginning with a particular character occur within the column, and so on.

In one embodiment, to optimize a query using the query planner 730, the order of indices to be used may be determined based (at least in part) on the statistics for the per-column indices. In one embodiment, the query planner 730 uses the most constraining index first, then the next most constraining index, and so on. In one embodiment, the statistics may be maintained in real time or near-real time to enable optimized query processing using up-to-date information. In one embodiment, the generation and maintenance of statistics for an index are performed by the graph database service 700 automatically, e.g., without being directly prompted by user input directing the statistics tasks. In one embodiment, an index and the statistics for the index are generated or updated by the graph database service 700 in response to the updating of one or more triples for the corresponding column in the graph database (e.g., the addition of one or more triples, the deletion of one or more triples, or the modification of one or more triples). In one embodiment, the graph database service 700 provides a query hint mechanism to optimize the performance of individual queries within specific applications.

In one embodiment, the query planner 730 may generate a query plan. In one embodiment, the query plan may include any suitable data and/or instructions to implement the query, such as an execution path tree. In one embodiment, the execution plans for queries differing in their query language may take a similar form that is essentially independent of the originating query language and/or its data model. In one embodiment, the graph database service 700 includes a query execution component 740, also referred to as an execution engine. In one embodiment, the execution engine may execute or otherwise implement execution plans that were generated for queries differing in their query language. In one embodiment, the execution engine may represent a unified, common platform for executing queries for multiple query languages that differ in their data model. In one embodiment, the execution engine may interact with the property-scoped indices 160A-160N to perform operations such as insertion of data elements into the triple table 150 and retrieval of data elements from the triple table.

Figure 8A:
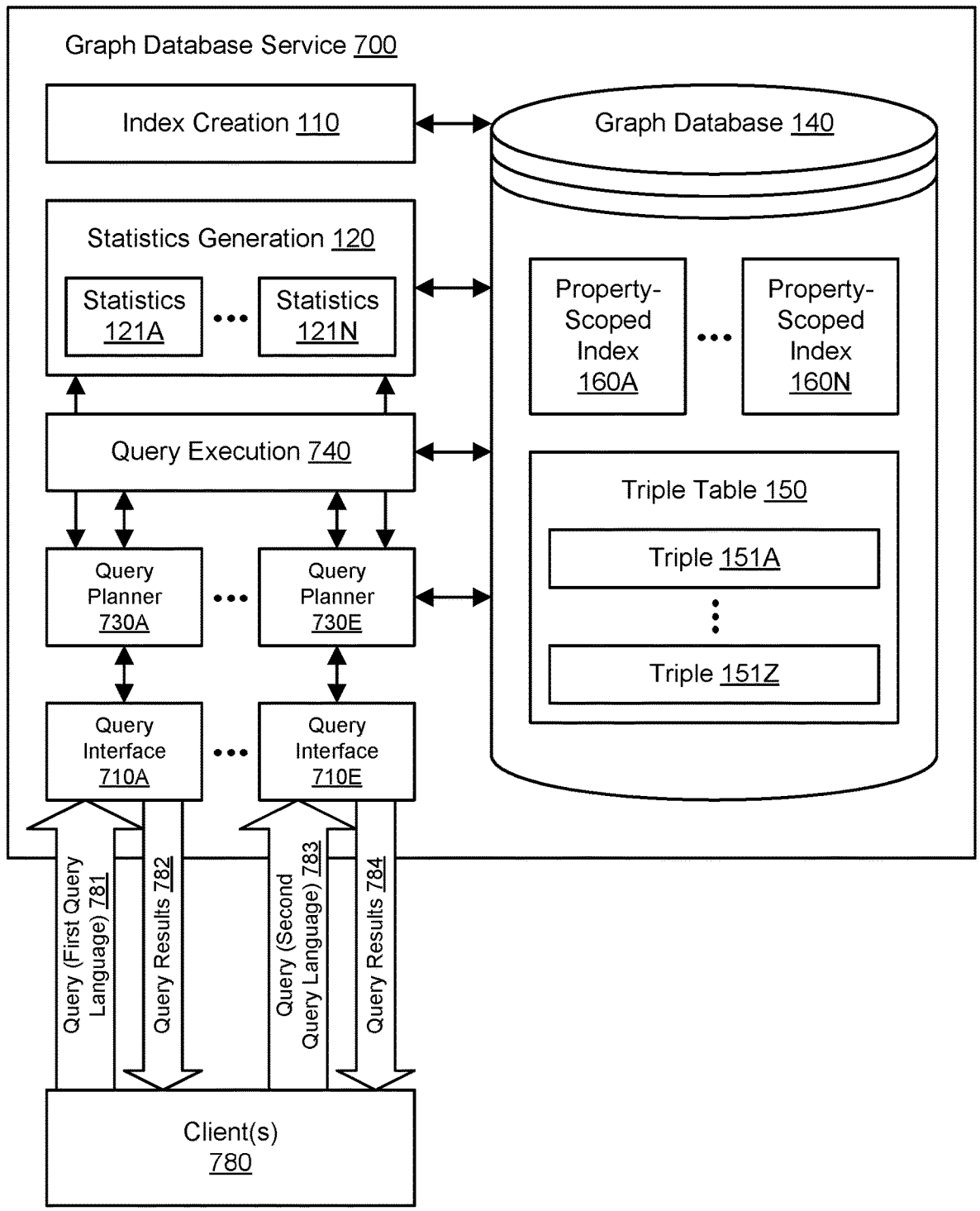
FIG. 8A, FIG. 8B, and FIG. 8C illustrate further aspects of the example system environment for query language interoperability in a graph database, including separate components for multiple query languages in a query pipeline, according to one embodiment.

FIG. 8A illustrates further aspects of the example system environment for query language interoperability in a graph database, including separate components for multiple query languages in a query pipeline, according to one embodiment. In one embodiment, the functionality of the query interface 710 as discussed above may be distributed among a plurality of language-specific query interface components. In one embodiment, for example, the graph database service 700 includes query interfaces 710A through 710E, each of which may receive queries expressed in one or more corresponding query languages. In one embodiment, one of the client(s) 780 may choose which of the query interfaces 710A-710E to use based on the query language in which the client seeks to express the query. In various embodiments, any suitable number and configuration of query interfaces 710A-710E may be used in the graph database system 700. In one embodiment, the query interfaces 710A-710E may perform operations such as query parsing, syntactic validation, and/or semantic validation in a manner specific to the query language(s) associated with the component.

Figure 8B:
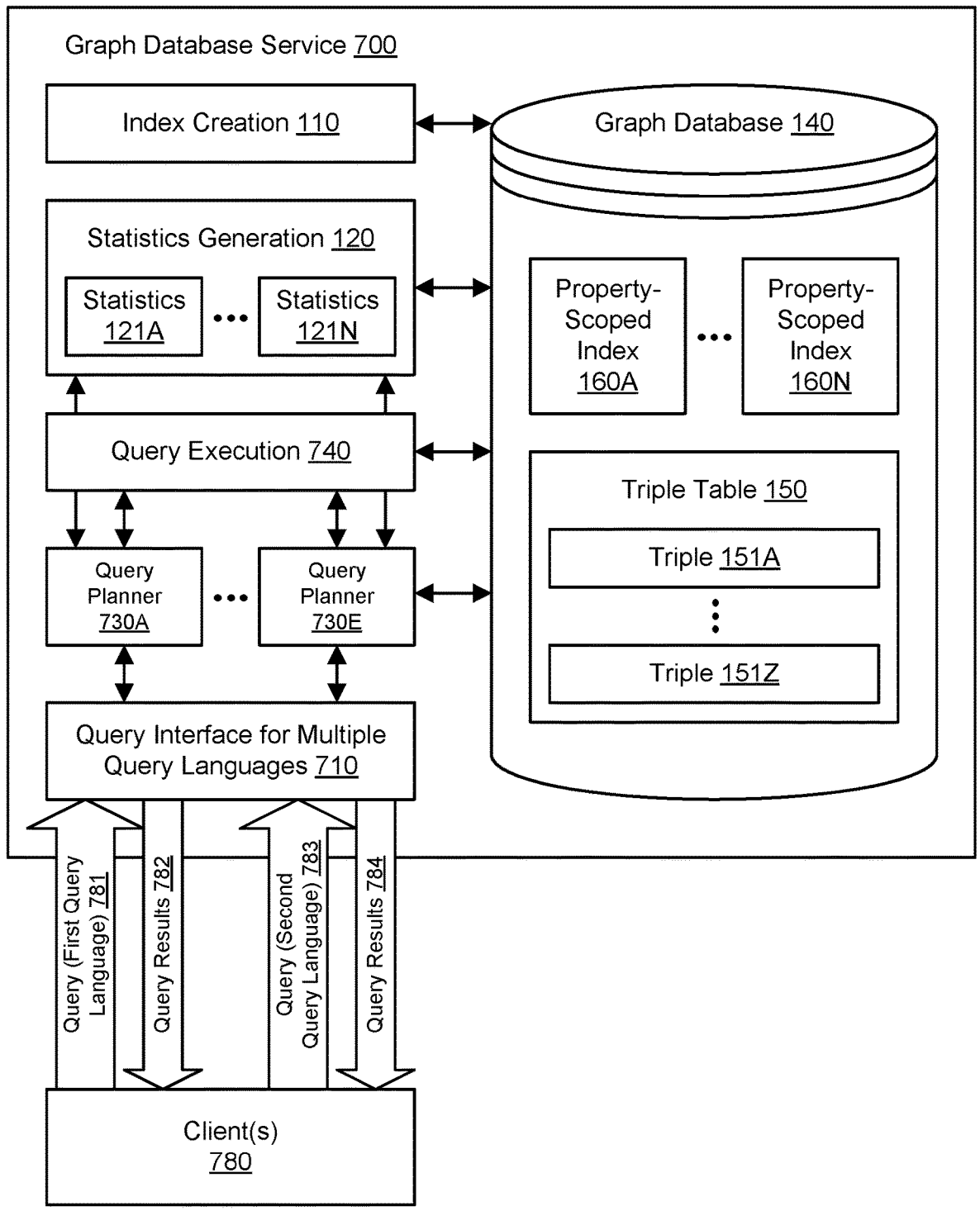
Figure 8C:
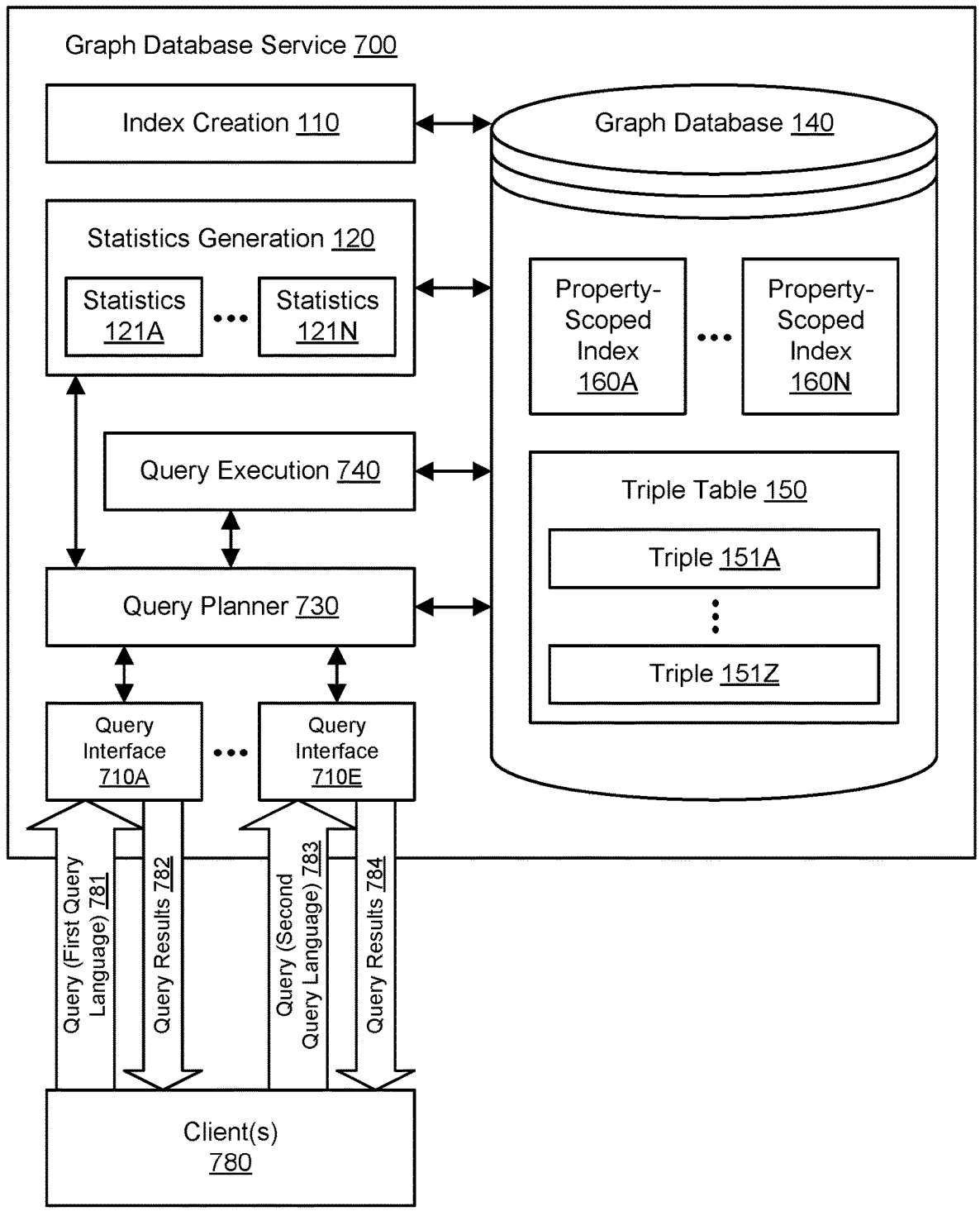

In one embodiment, the functionality of the query planner 730 as discussed above may be distributed among a plurality of language-specific query planner components. In one embodiment, for example, the graph database service 700 includes query interfaces 730A through 730E, each of which may optimize queries and generate query plans for queries expressed in one or more corresponding query languages. In one embodiment, any of the query interfaces 730A-730E may be part of a query pipeline that also includes one of the language-specific query interface components 710A-710E. In one embodiment, the query planner 730A-730E used for a particular query may vary based on the query interface component 710A-710E. In various embodiments, any suitable number and configuration of query interfaces 730A-730E may be used in the graph database system 700. In one embodiment, the execution plans generated by the various query planning components 730A-730E may take a similar form that is essentially independent of the originating query language and/or data model. In one embodiment, query plans generated using the query planning components 730A-730E may be executed by the same execution engine 740 as discussed above with respect to FIG. 7. In one embodiment, as illustrated in FIG. 8B, a plurality of language-specific query planners 730A-730E may be used in a pipeline with a unified query interface 710 for multiple query languages. In one embodiment, as illustrated in FIG. 8C, a plurality of language-specific query interfaces 710A-710E may be used in a pipeline with a unified query planner 730 for multiple query languages.

In one embodiment, queries of the graph database may include semantic queries expressed according to any of the supported query languages. In one embodiment, a semantic query may permit the retrieval of both explicitly and implicitly derived information from the graph database based on syntactic, semantic, and structural information embodied in the database. In one embodiment, a semantic query may return a specific or precise result such as a single piece of information. In one embodiment, a semantic query may return an answer to a "fuzzier" or less specific question through pattern matching and machine logic. In one embodiment, by operating on the triples in the graph database, a semantic query may process the actual relationships between information and determine an answer from the network of connections in the graph database. In one embodiment, a semantic query may operate on structured data and utilize features such as operators (e.g., >, <, and =), pattern matching, and so on. In one embodiment, semantic queries of the graph database are formatted in the syntax of a query language such as SPARQL that is particularly suited for semantic queries and may be referred to as a semantic query language. In one embodiment, a semantic query may be written without knowledge of a database schema in the graph database. In one embodiment, a query of the graph database may be expressed in a query language such as Gremlin that is particularly suited for graph traversal queries and may be referred to as a graph traversal language or graph query language. In one embodiment, the form of a semantic query may differ from the form of a graph traversal query. In one embodiment, both semantic queries and graph traversal queries may be mapped to and from the internal data model of the graph database. In one embodiment, the graph database service 700 may support queries that perform a simple text search on property values. In one embodiment, in the property graph model associated with one or more query languages such as Gremlin, the text search may search over node and edge properties. In one embodiment, in the resource description framework (RDF) model associated with one or more query languages such as SPARQL, the text search may search over literal values.

In one embodiment, the graph database service 700 may be used by client(s) 780 in varying domains such as social networks, recommendation engines, data management, network and IT management, fraud detection, medical applications, Online Transaction Processing (OLTP) and Online Analytics Processing (OLAP) workloads, and so on. In one embodiment, the graph database service 700 may be used for processing of streaming data that is rich (e.g., representing a large amount of information) and highly connected (e.g., representing many relationships). In one embodiment, for example, clients in the financial sector may use the graph database service 700 to process a stream of credit card transactions as graph queries to identify potential anomalies. In one embodiment, as a more specific example, a client of the graph database service 700 may supply a graph query to detect a purchase that takes place in one geographical region and is followed by one in another geographical region five minutes later. In one embodiment, detecting that a customer had two transactions that occurred closely together, but took place thousands of miles apart, the client of the graph database service 700 may generate an alert and send it to the customer. In one embodiment, as another example, the graph database service 700 may be used by a retail company to make purchase recommendations for a customer based on purchasing behavior of the customer's friends. In one embodiment, as yet another example, the graph database service 700 may be used by a life sciences organization to analyze the relationships between different chemicals and compounds to detect drug interactions. In various embodiments, these use cases may be implemented using one or more supported query languages that are mapped to and from the internal data model of the graph database 140.

In one embodiment, the graph database service may be used by client(s) 780 for combining and analyzing the large quantities of relationship information aggregated in the clients' OLTP and OLAP applications. In one embodiment, beyond short interactive queries (e.g., for OLTP) and longer-running complex queries (e.g., for OLAP), graph analytics using the graph database service may produce new insights by analyzing entire collections of relationships. In one embodiment, graph analytics may use iterative algorithms to process very large graphs and mine them for new information. In one embodiment, examples of such graph analytics may include using search engine algorithms for detecting web page relevance, using a community detection algorithm to detect groups of similar users from a large social network, and executing a shortest path algorithm to find the lowest cost route from point A to point B on a network of roads. Such tasks may be computationally challenging for conventional databases (e.g., relational databases) because they often require visiting all of the relationships (edges) in the graph multiple times to converge on a result. In various embodiments, these graph analytics cases may be implemented using one or more supported query languages that are mapped to and from the internal data model of the graph database 140.

In one embodiment, the graph database service 700 supports incoming and outgoing streams of graph data. In one embodiment, the graph database service 700 may be used in conjunction with machine-learning and deep-learning applications and services such that relationship-rich data in the graph database can be analyzed to identify areas in which to use machine-learning algorithms. In one embodiment, the graph database service 700 may be used to represent and scale knowledge graphs. In one embodiment, the graph database service 700 provides native support for processing large quantities of relationship information. In one embodiment, by supporting a variety of query languages, the graph database service 700 supports both the property graph and resource description framework (RDF) graph models to permit flexibility in querying data on behalf of clients.

In one embodiment, the client(s) 780 may encompass any type of client suitable to submit data and requests to the graph database service 700. In one embodiment, the client(s) 780 may include one or more services or applications that seek to make use of the graph database service 700. In one embodiment, the client(s) 780 may convey network-based service requests to the service via one or more networks. In various embodiments, the network(s) may encompass any suitable combination of networking hardware and protocols necessary to establish network-based communications between the client and the graph database service. In one embodiment, for example, the network(s) may generally encompass the various telecommunications networks and service providers that collectively implement the Internet. In one embodiment, the network(s) may also include private networks such as local area networks (LANs) or wide area networks (WANs) as well as public or private wireless networks. In one embodiment, for example, both the client(s) 780 and the graph database service 700 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client and the Internet as well as between the Internet and the graph database service. In one embodiment, the client(s) 780 may communicate with the graph database service using a private network rather than the public Internet.

In one embodiment, the graph database service 700 may include one or more computing devices, any of which may be implemented by the example computing device 3000 illustrated in FIG. 14, and any suitable storage resources. Similarly, in one embodiment, the client(s) 780 may be implemented using the example computing device 3000 illustrated in FIG. 14. In various embodiments, portions of the described functionality of the service 700, database 140, and/or client(s) 780 may be provided by the same computing device or by any suitable number of different computing devices. In one embodiment, if any of the components are implemented using different computing devices, then the components and their respective computing devices may be communicatively coupled, e.g., via a network. In one embodiment, each of the illustrated components (such as the graph database service and its constituent components) may represent any combination of software and hardware usable to perform their respective functions. In various embodiments, the graph database service and/or graph database may include additional components not shown, fewer components than shown, or different combinations, configurations, or quantities of the components shown.

Figure 9:
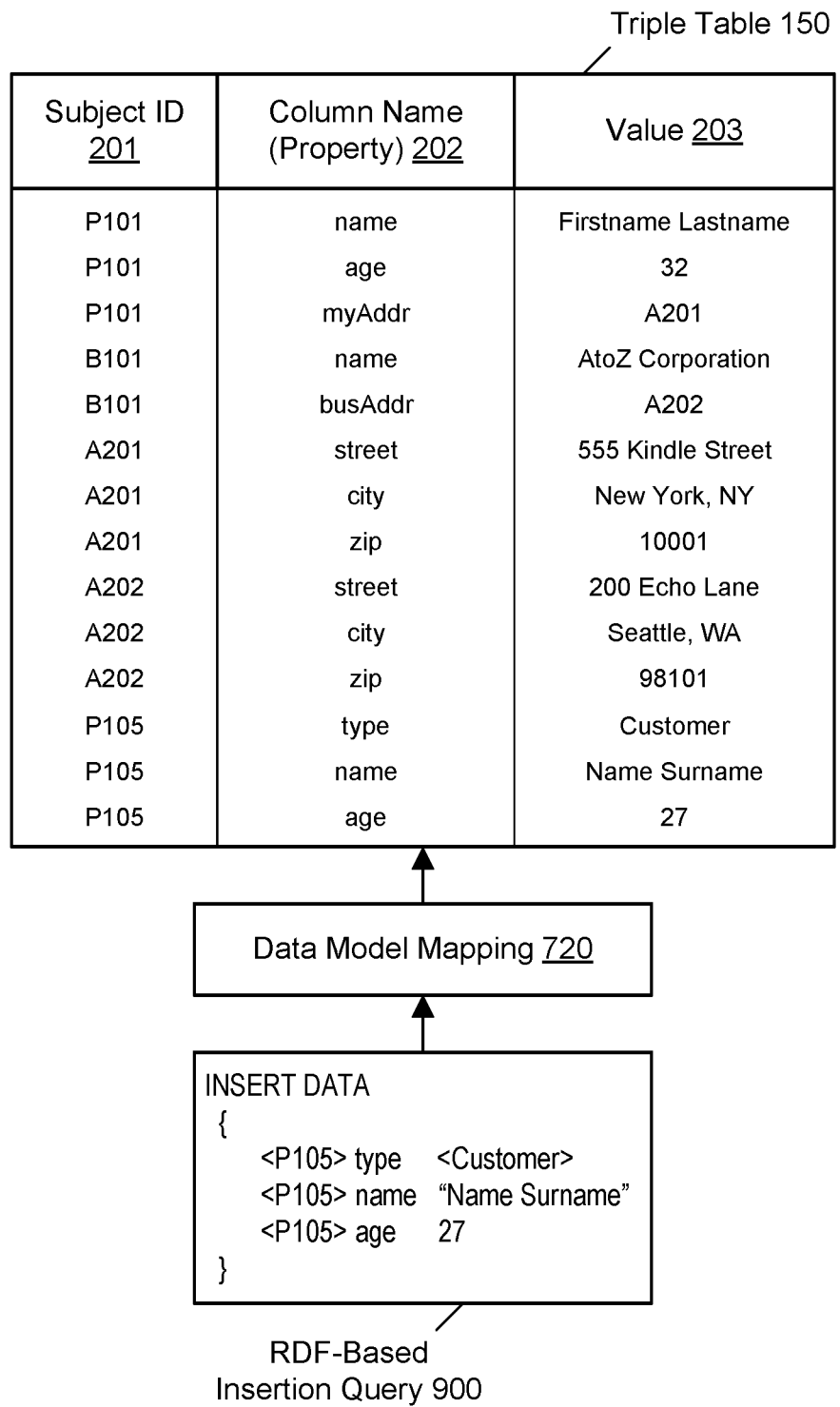
FIG. 9 illustrates an example of a graph database that supports query language interoperability, including insertion of data elements expressed according to a resource description framework (RDF) data model, according to one embodiment.

FIG. 9 illustrates an example of a graph database that supports query language interoperability, including insertion of data elements expressed according to a resource description framework (RDF) data model, according to one embodiment. In one embodiment, the graph database service 700 may support queries expressed in a graph database query language typically used for semantic queries (e.g., SPARQL) and whose data model represents the data elements as resource description framework (RDF) triples comprising subjects, predicates, and objects. In one embodiment, a semantic query may operate on structured data and utilize features such as operators (e.g., >, <, and =), pattern matching, and so on. In one embodiment, semantic queries of the graph database are formatted in the syntax of a query language such as SPARQL that is particularly suited for semantic queries and may be referred to as a semantic query language. In one embodiment, a semantic query may be written without knowledge of a database schema in the graph database. In one embodiment, the graph database service 700 may support queries in SPARQL or another semantic query language to insert one or more triples into a graph, delete one or more triples from a graph, load the contents of a document representing a graph into the graph database, and clear all the triples in one or more graphs. In one embodiment, performing such a query may include a data model mapping operation 720 in which elements of data in the "source" data model of the query are mapped to elements of data as expressed in the internal data model of the triple table 150. In one embodiment, as shown in the example of FIG. 9, an RDF-based query 900 (expressed in a query language such as SPARQL) may be processed to insert a triple (subject, predicate, object) as at least one subject ID, column name, and value in the triple table 150.

In various embodiments, any suitable mapping may be used between RDF-based queries and the triple table 150. In one embodiment, for example, subjects in an RDF-based query may be mapped to subject IDs in the triple table 150, predicates may be mapped to column names, and objects may be mapped to values. In one embodiment, an RDF graph construct may be mapped to a container construct in the triple table 150. In one embodiment, the RDF-based insertion query 900 may be formatted according to the following example, where the subject <P105> may be mapped to a subject ID in the triple table 150, the predicates ("type," "name," and "age") may be mapped to column names in the triple table, and the objects of those predicates may be mapped to values in the triple table:

```
INSERT DATA
{
    <P105> type  <Customer>
    <P105> name "Name Surname"
    <P105> age   27
}
```

In one embodiment, the RDF-based insertion query 900 may include one or more additional fields such as in the following example, where the triples are associated with a graph identifier (http://customerList) that is mapped to a graph ID previously illustrated in FIG. 2B:

```
INSERT DATA
{
    GRAPH <http://customerList>
    {
        <P105> type  <Customer>
        <P105> name "Name Surname"
        <P105> age   27
    }
}
```

Figure 10:
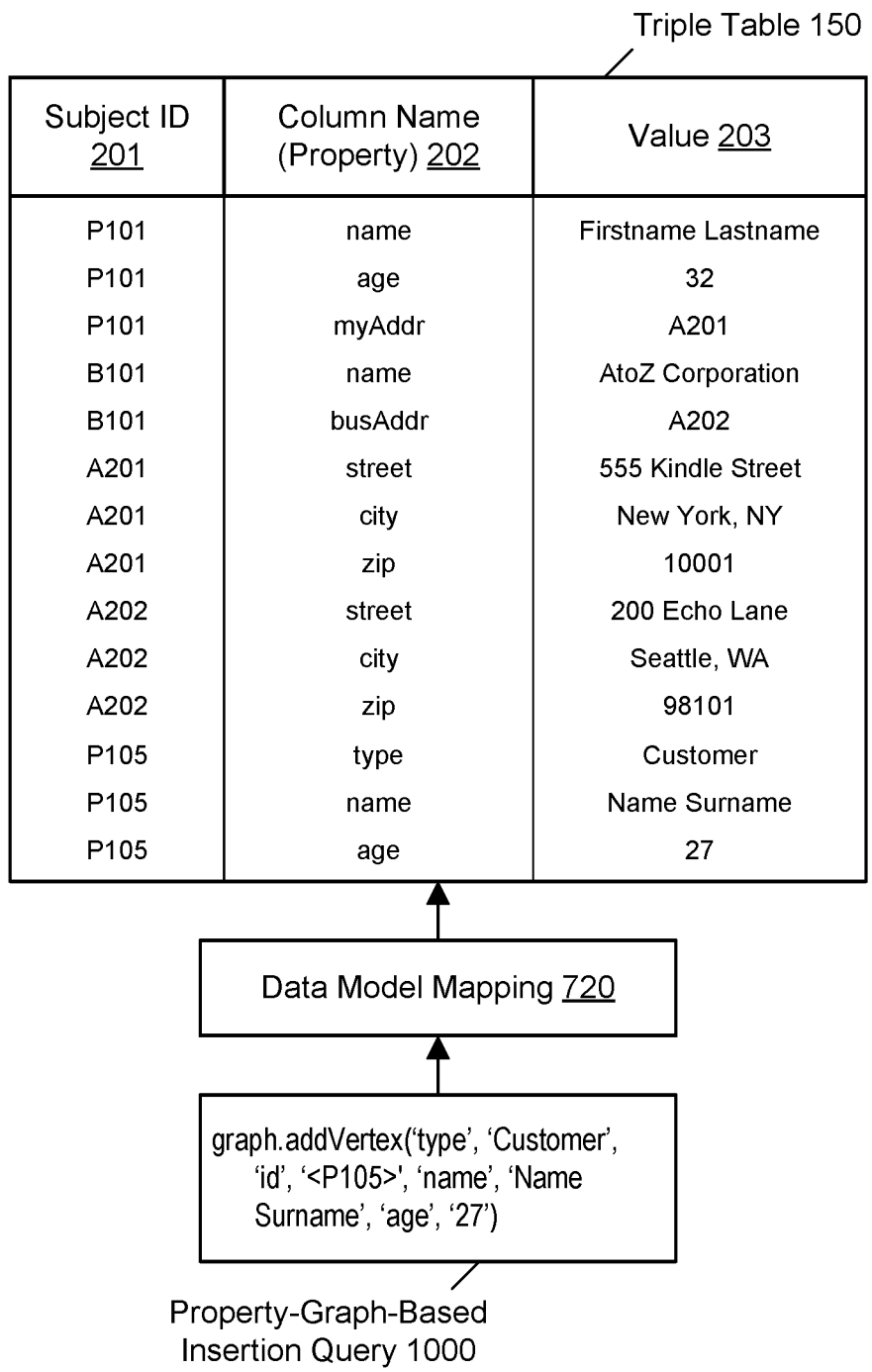
FIG. 10 illustrates an example of a graph database that supports query language interoperability, including insertion of data elements expressed according to a property graph data model, according to one embodiment.

FIG. 10 illustrates an example of a graph database that supports query language interoperability, including insertion of data elements expressed according to a property graph data model, according to one embodiment. In one embodiment, the graph database service 700 may support queries expressed in a graph database query language typically used for graph traversal queries (e.g., Gremlin) and whose data model represents the data elements as property graphs. In one embodiment, the form of a graph traversal query may differ from the form of a semantic query. In one embodiment, both semantic queries and graph traversal queries may be mapped to and from the internal data model of the graph database. In one embodiment, as shown in the example of FIG. 10, a property-graph-based query 1000 (expressed in a query language such as Gremlin) may be processed to insert one or more nodes or edges (or properties thereof) of a property graph as at least one subject ID, column name, and value in the triple table 150. In one embodiment, performing such a query may include a data model mapping operation 720 in which elements of data in the "source" data model of the query 1000 are mapped to elements of data as expressed in the internal data model of the triple table 150.

In various embodiments, any suitable mapping may be used between property-graph-based queries and the triple table 150. In one embodiment, to achieve a similar result as the RDF-based insertion query 900, a property-graph-based insertion query 1000 may be formatted according to the following example:

graph.addVertex('type', 'Customer', 'id', '<P105>', 'name', 'Name Surname', 'age', '27')

In one embodiment, the property-graph-based insertion query 1000 may include one or more additional fields such as in the following example, where the inserted values are associated with a graph identifier (http://customerList) that is mapped to a graph ID previously illustrated in FIG. 2B:

graph.addVertex('type', 'Customer', 'id', '<P105>', '_container', '<http://customerList>', 'name', 'Name Surname', 'age', '27')

Figure 11:
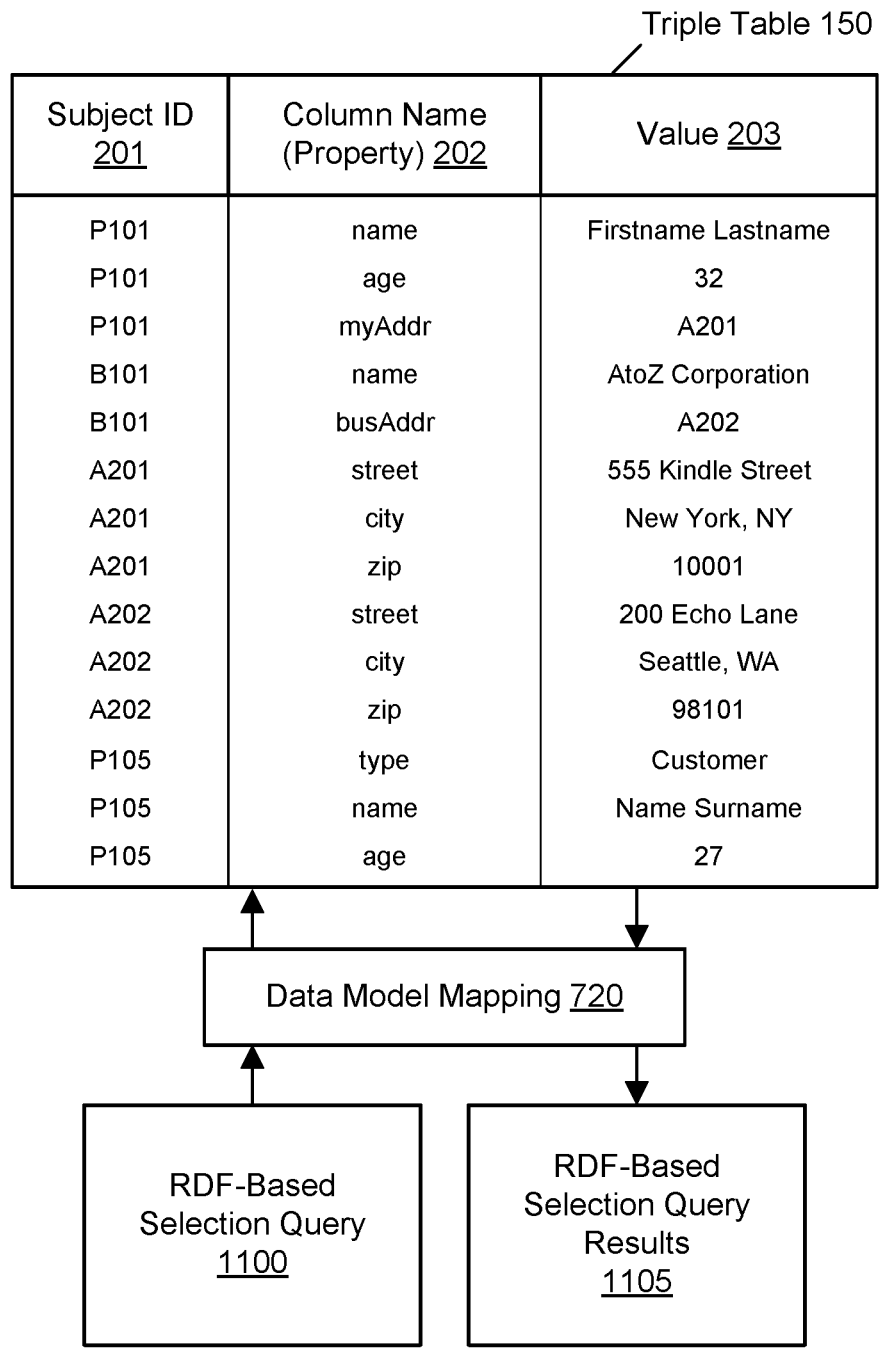
FIG. 11 illustrates an example of a graph database that supports query language interoperability, including retrieval of data elements expressed according to an RDF data model, according to one embodiment.

FIG. 11 illustrates an example of a graph database that supports query language interoperability, including retrieval of data elements expressed according to an RDF data model, according to one embodiment. In one embodiment, the graph database service 700 may support queries that perform a simple text search on property values. In one embodiment, in the RDF model associated with one or more query languages such as SPARQL, the text search may search over literal values. In one embodiment, the graph database service 700 may support queries in SPARQL or another semantic query language to select values from the graph database and return them in a tabular format, construct information extracted from the graph database and transform it into an RDF form, ask for a true/false result of a query, and describe an extracted RDF graph extracted from the graph database. In one embodiment, performing such a query may include a data model mapping operation 720 in which elements of data in the internal data model are mapped to and from elements of data as expressed in the data model associated with the query language. In one embodiment, as shown in the example of FIG. 11, an RDF-based query 1100 (expressed in a query language such as SPARQL) may be processed to select one or more triples (subject, predicate, object) from the triple table 150. In one embodiment, the RDF-based query results 1105 may be retrieved from the triple table, mapped to RDF triples using the data model mapping 720, and returned to the appropriate client.

Figure 12:
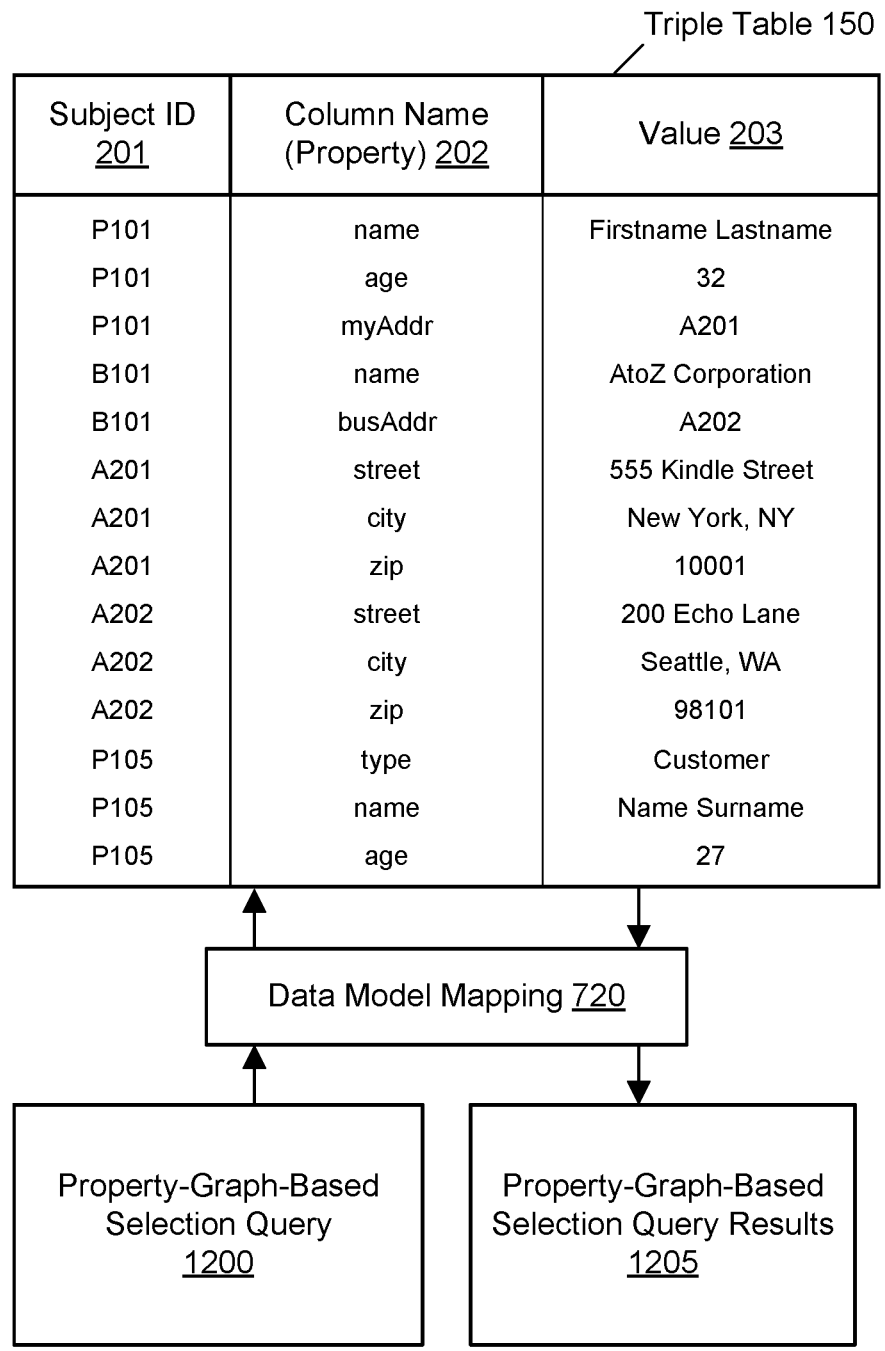
FIG. 12 illustrates an example of a graph database that supports query language interoperability, including retrieval of data elements expressed according to a property graph data model, according to one embodiment.

FIG. 12 illustrates an example of a graph database that supports query language interoperability, including retrieval of data elements expressed according to a property graph data model, according to one embodiment. In one embodiment, the graph database service 700 may support queries that perform a simple text search on property values. In one embodiment, in the property graph model associated with one or more query languages such as Gremlin, the text search may search over node and edge properties. In one embodiment, performing such a query may include a data model mapping operation 720 in which elements of data in the internal data model are mapped to and from elements of data as expressed in the data model associated with the query language. In one embodiment, as shown in the example of FIG. 12, a property-graph-based query 1200 (expressed in a query language such as Gremlin) may be processed to select one or more nodes, edges, or properties thereof from the triple table 150. In one embodiment, the property-graph-based query results 1205 may be retrieved from the triple table, mapped to the property graph data model using the data model mapping 720, and returned to the appropriate client.

Figure 13:
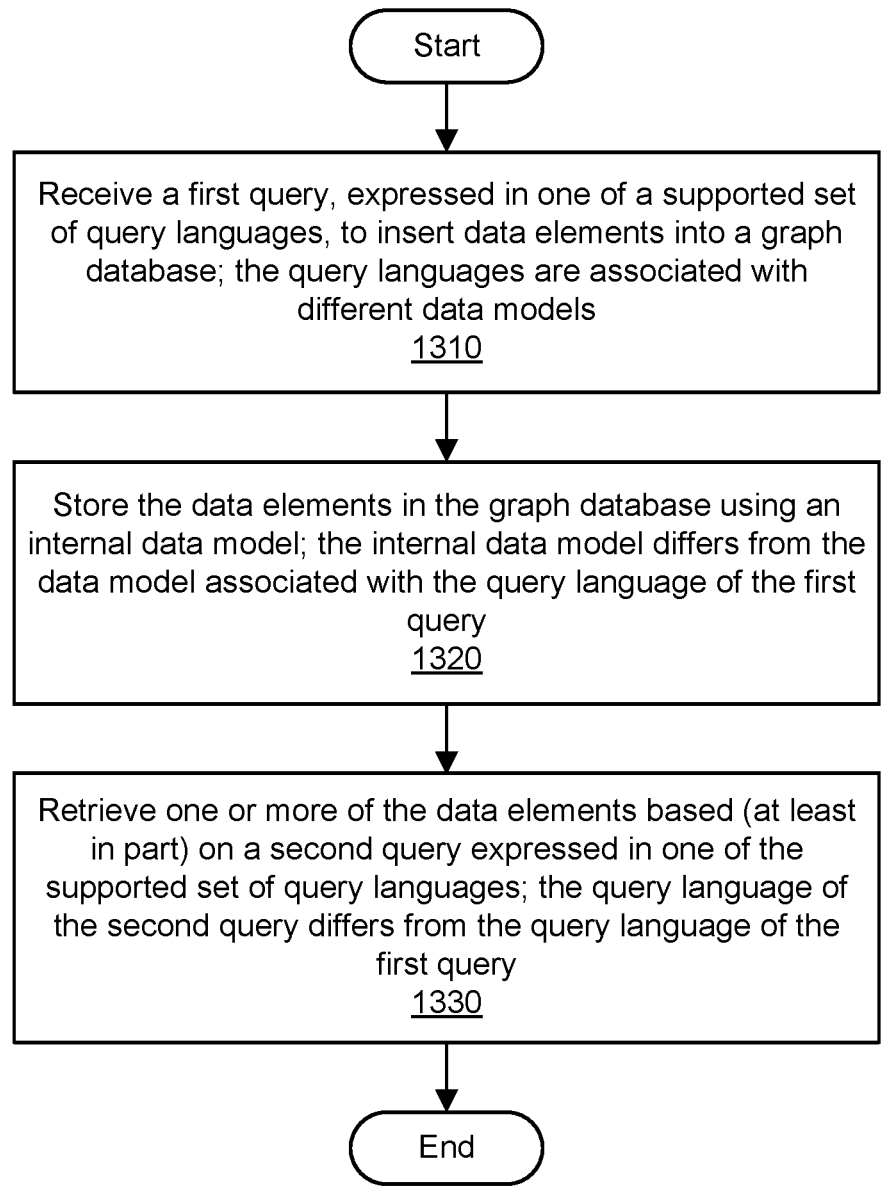
FIG. 13 is a flowchart illustrating a method for implementing query language interoperability in a graph database, according to one embodiment.

FIG. 13 is a flowchart illustrating a method for implementing query language interoperability in a graph database, according to one embodiment. In one embodiment, as shown in 1310, a first query may be received at a graph database service or system. In one embodiment, the first query may seek to insert one or more data elements into the graph database. In one embodiment, the first query may be expressed in one particular query language of a supported set of query languages. In one embodiment, the query languages may include at least two graph database query languages that are typically associated with querying graph databases. In various embodiments, for example, the graph database may be accessed with graph database query languages such as SPARQL, Gremlin, and/or GraphQL. In one embodiment, any of the supported query languages may be associated with a corresponding data model. In one embodiment, the first query may be expressed in a graph database query language typically used for semantic queries (e.g., SPARQL) and whose data model represents the data elements as resource description framework (RDF) triples comprising subjects, predicates, and objects. In one embodiment, the first query may be expressed in a graph database query language typically used for graph traversal queries (e.g., Gremlin) and whose data model represents the data elements as property graphs.

In one embodiment, as shown in 1320, the data elements may be stored in the graph database using an internal data model. In one embodiment, the internal data model differs in at least some respects from the data model associated with the query language in which the first query was expressed. In one embodiment, for example, the internal data model represents data as triples of subject identifiers, column names, and values, while the data model associated with the first query may express data as RDF triples (with subjects, predicates, and objects) or property graphs (with nodes and edges). In one embodiment, the data elements may be mapped to the internal data model from the data model associated with the first query.

In one embodiment, columns in the internal data model are strongly typed such that values in a particular column may share the same data type, and an enforcement mechanism may ensure that values in the particular column are limited to being expressed in the data type associated with the column. In one embodiment, column names in the internal data model are globally scoped in the graph database, such that the same column name may not be represented more than once in the graph database and may not be limited to a particular sub-table of the graph database. In one embodiment, indices may be created or updated for the globally scoped columns in the internal data model in the graph database. In one embodiment, indices are created and maintained for many but not necessarily all global columns in the primary table in the graph database, e.g., for columns that are intended to be queryable or searchable. In one embodiment, a per-column index may be a table or other columnar data structure that includes multiple rows, and each row may include the values associated with the column corresponding to the index. In one embodiment, statistics may be generated or updated incrementally for the indices, e.g., in order to optimize queries. In one embodiment, the statistics for an index may represent distributions of values within the corresponding column. In one embodiment, for example, the statistics may indicate how many times a particular value occurs within the column, how many triples having numeric values within a particular numeric range occur within the column, how many triples having string-typed values beginning with a particular character occur within the column, and so on. In one embodiment, the generation and maintenance of indices and statistics is performed by the graph database service automatically, e.g., without being directly prompted by user input directing the indexing tasks.

In one embodiment, as shown in 1330, at least some of the data elements inserted using the first query may be retrieved from the graph database based (at least in part) on a second query. In one embodiment, the second query is expressed in a query language that differs from the query language in which the first query was expressed. For example, in one embodiment, the data elements may be inserted using a query expressed in a semantic query language such as SPARQL and retrieved (at least in part) using a query expressed in a graph traversal language such as Gremlin. As another example, in one embodiment, the data elements may be inserted using a query expressed in a graph traversal language such as Gremlin and retrieved (at least in part) using a query expressed in a semantic query language such as SPARQL. In one embodiment, the data elements may be mapped from the internal data model to the data model associated with the second query. In one embodiment, the query is performed (e.g., by a query planner) using the indices corresponding to column names (as represented in the internal data model) associated with the query. In one embodiment, to optimize a query, the order of indices to be used may be determined based (at least in part) on the statistics for the per-column indices. In one embodiment, the query planner uses the most constraining index first, then the next most constraining index, and so on. In one embodiment, the graph database may provide interoperability of a plurality of supported query languages (and their associated data models) using a common storage scheme.

Illustrative Computer System

In one embodiment, a computer system that implements a portion or all of one or more of the technologies described herein may include a computer system that includes or is configured to access one or more computer-readable media. FIG. 14 illustrates such a computing device 3000 in one embodiment. In one embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In various embodiments, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In one embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. In one embodiment, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in some embodiments, program instructions and/or data may be received, sent or stored upon different types of computer-readable media. In one embodiment, generally speaking, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or various types of computer systems. In one embodiment, the term "computing device" refers to at least all these types of devices, and is not limited to these types of devices.

The various methods as illustrated in the Figures and described herein represent examples of embodiments of methods. In various embodiments, the methods may be implemented in software, hardware, or a combination thereof. In various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention; the first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more processors;
memory to store computer-executable instructions that, if executed, cause the one or more processors to:
insert a plurality of data elements into a graph database using one or more of a plurality of graph database query languages, wherein the graph database query languages comprise a first graph database query language associated with a first data model and a second graph database query language associated with a second data model, and wherein one or more of the data elements is inserted using first graph database query language and another one or more of the data elements is inserted using second graph database query language;
store the data elements in the graph database using an internal data model, wherein the internal data model differs from the first data model and the second data model, and wherein the internal data model represents individual ones of the data elements using a respective subject identifier, a plurality of column names, and respective values for the plurality of column names; and
retrieve one or more of the data elements from the graph database based at least in part on a query, wherein the query is expressed using the first graph database query language and retrieves one or more data elements inserted using the second graph database query language, or wherein the query is expressed using the second graph database query language and retrieves one or more data elements inserted using the first graph database query language.

2. The system as recited in claim 1, wherein the first data model represents data elements using resource description framework (RDF) triples comprising subjects, predicates, and objects, and wherein the second data model represents data elements using property graphs.

3. The system as recited in claim 2, wherein a set of the data elements are inserted into the graph database based at least in part on mapping one or more RDF triples to the internal data model, and wherein the set of the data elements are retrieved from the graph database based at least in part on mapping the internal data model to one or more property graphs.

4. The system as recited in claim 2, wherein a set of the data elements are inserted into the graph database based at least in part on mapping one or more property graphs to the internal data model, and wherein the set of the data elements are retrieved from the graph database based at least in part on mapping the internal data model to one or more RDF triples.

5. A method, comprising:
inserting a plurality of data elements into a graph database using a plurality of query languages, wherein the query languages comprise a first query language associated with a first data model and a second query language associated with a second data model, wherein one or more of the data elements is inserted using first graph database query language and another one or more of the data elements is inserted using second graph database query language, and wherein the data elements are stored in the graph database using an internal data model that differs from the first data model and the second data model; and
retrieving one or more of the data elements from the graph database based at least in part on a query, wherein the query is expressed using a different one of the query languages than was used in inserting the one or more of the data elements.

6. The method as recited in claim 5, wherein the first data model represents data elements using resource description framework (RDF) triples comprising subjects, predicates, and objects, and wherein the second data model represents data elements using property graphs.

7. The method as recited in claim 6, wherein a set of the data elements are inserted into the graph database based at least in part on mapping one or more RDF triples to the internal data model, and wherein the set of the data elements are retrieved from the graph database based at least in part on mapping the internal data model to one or more property graphs.

8. The method as recited in claim 6, wherein a set of the data elements are inserted into the graph database based at least in part on mapping one or more property graphs to the internal data model, and wherein the set of the data elements are retrieved from the graph database based at least in part on mapping the internal data model to one or more RDF triples.

9. The method as recited in claim 5, further comprising:
retrieving an additional one or more of the data elements from the graph database based at least in part on an additional query, wherein the query and the additional query are expressed using different ones of the query languages.

10. The method as recited in claim 9, further comprising:
generating a query execution plan based at least in part on the query;
generating an additional query execution plan based at least in part on the additional query; and
executing the query execution plan and the additional query execution plan using an execution engine.

11. The method as recited in claim 5, wherein the internal data model represents the data elements using subject identifiers, column names, and values for the column names, wherein the column names are globally scoped in the graph database, and wherein the column names are associated with respective data types for the values.

12. The method as recited in claim 11, further comprising:
creating indices corresponding to the column names, wherein an individual one of the indices comprises one or more of the values associated with the corresponding column name, and wherein the query is performed using one or more of the indices corresponding to one of more of the column names associated with the query.

13. A computer-readable storage medium to store program instructions that, if executed, cause one or more processors to perform:
inserting a plurality of data elements into a graph database using a plurality of graph database query languages, wherein the graph database query languages comprise a first graph database query language associated with a first data model and a second graph database query language associated with a second data model, wherein one or more of the data elements is inserted using first graph database query language and another one or more of the data elements is inserted using second graph database query language, and wherein the data elements are stored in the graph database using an internal data model that differs from the first data model and the second data model; and
retrieving one or more of the data elements from the graph database based at least in part on a query, wherein the query is expressed using the first graph database query language and retrieves one or more data elements inserted using the second graph database query language, or wherein the query is expressed using the second graph database query language and retrieves one or more data elements inserted using the first graph database query language.

14. The computer-readable storage medium as recited in claim 13, wherein the first data model represents data elements using resource description framework (RDF) triples comprising subjects, predicates, and objects, and wherein the second data model represents data elements using property graphs.

15. The computer-readable storage medium as recited in claim 14, wherein a set of the data elements are inserted into the graph database based at least in part on mapping one or more RDF triples to the internal data model, and wherein the set of the data elements are retrieved from the graph database based at least in part on mapping the internal data model to one or more property graphs.

16. The computer-readable storage medium as recited in claim 14, wherein a set of the data elements are inserted into the graph database based at least in part on mapping one or more property graphs to the internal data model, and wherein the set of the data elements are retrieved from the graph database based at least in part on mapping the internal data model to one or more RDF triples.

17. The computer-readable storage medium as recited in claim 13, wherein the program instructions are further computer-executable to perform:
retrieving an additional one or more of the data elements from the graph database based at least in part on an additional query, wherein the query and the additional query are expressed using different ones of the graph database query languages.

18. The computer-readable storage medium as recited in claim 17, wherein the program instructions are further computer-executable to perform:
generating a query execution plan based at least in part on the query;
generating an additional query execution plan based at least in part on the additional query; and
executing the query execution plan and the additional query execution plan using an execution engine.

19. The computer-readable storage medium as recited in claim 13, wherein the internal data model represents the data elements using subject identifiers, column names, and values for the column names, wherein the column names are globally scoped in the graph database, and wherein the column names are associated with respective data types for the values.

20. The computer-readable storage medium as recited in claim 19, wherein the program instructions are further computer-executable to perform:
creating indices corresponding to the column names, wherein an individual one of the indices comprises one or more of the values associated with the corresponding column name, and wherein the query is performed using one or more of the indices corresponding to one of more of the column names associated with the query.

* * * * *